US010120160B2

(12) United States Patent
Shirono

(10) Patent No.: US 10,120,160 B2
(45) Date of Patent: Nov. 6, 2018

(54) LENS BARREL, IMAGING ELEMENT SUPPORT STRUCTURE, ELECTRONIC VIEW FINDER, AND IMAGING DEVICE

(71) Applicant: Samsung Electronics Co., Ltd., Suwon-si, Gyeonggi-do (KR)

(72) Inventor: Masahiro Shirono, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 15/237,068

(22) Filed: Aug. 15, 2016

(65) Prior Publication Data

US 2016/0349478 A1    Dec. 1, 2016

Related U.S. Application Data

(63) Continuation of application No. PCT/KR2015/001242, filed on Feb. 6, 2015.

(30) Foreign Application Priority Data

Feb. 28, 2014  (JP) ................................. 2014-038122
Aug. 15, 2014  (JP) ................................. 2014-165433

(51) Int. Cl.
*G02B 7/02*      (2006.01)
*G02B 7/04*      (2006.01)
*G02B 7/10*      (2006.01)
*G02B 27/64*     (2006.01)
*G03B 3/02*      (2006.01)
(Continued)

(52) U.S. Cl.
CPC ............... *G02B 7/04* (2013.01); *G02B 7/021* (2013.01); *G02B 7/022* (2013.01); *G02B 7/023* (2013.01); *G02B 7/10* (2013.01); *G02B 27/646* (2013.01); *G03B 3/02* (2013.01); *G03B 5/00* (2013.01); *H04N 5/2253* (2013.01); *H04N 5/2254* (2013.01); *H04N 5/23293* (2013.01); *G03B 2205/0007* (2013.01); *G03B 2205/0046* (2013.01)

(58) Field of Classification Search
CPC ........ G02B 7/021; G02B 7/022; G02B 7/023; G02B 7/04; G02B 7/10
USPC ................................. 359/704, 819, 821–826
See application file for complete search history.

(56) References Cited

U.S. PATENT DOCUMENTS 6,204,979 B1    3/2001  Matsui
6,556,362 B2    4/2003  Takanashi et al.
(Continued)

FOREIGN PATENT DOCUMENTS

CN    102141671 A    8/2011
JP    59-067950 U    5/1984
(Continued)

*Primary Examiner* — Darryl J Collins
(74) *Attorney, Agent, or Firm* — Jefferson IP Law, LLP

(57) ABSTRACT

When a plurality of opening units is provided for each lens unit in order to adjust the inclination and eccentricity of a lens unit, the design of an imaging device may be constrained and the size of an imaging device may increase. In order to prevent this constraint, provided are a lens barrel, an imaging element support structure, and an electronic viewfinder that may adjust the inclination and eccentricity of a lens unit by using an insertion unit including an eccentric cylinder unit and a frame support unit including a through hole including a plurality of openings having different opening widths.

15 Claims, 21 Drawing Sheets

(51) Int. Cl.
*G03B 5/00* (2006.01)
*H04N 5/225* (2006.01)
*H04N 5/232* (2006.01)

(56) References Cited

U.S. PATENT DOCUMENTS

| | | | |
|---|---|---|---|
| 6,570,719 | B2 | 5/2003 | Koiwai et al. |
| 7,013,081 | B2 | 3/2006 | Nomura et al. |
| 7,420,748 | B2 | 9/2008 | Koyama |
| 8,023,813 | B2 | 9/2011 | Yumiki et al. |
| 8,467,139 | B2 | 6/2013 | Terao |
| 8,537,478 | B2 | 9/2013 | Nuno et al. |
| 9,030,765 | B2 | 5/2015 | Okada |
| 2011/0181969 | A1 | 7/2011 | Terao |
| 2012/0086821 | A1 | 4/2012 | Yasutomi et al. |
| 2013/0107381 | A1* | 5/2013 | Ezawa ............... G02B 7/023 359/823 |
| 2013/0308211 | A1 | 11/2013 | Okada |

FOREIGN PATENT DOCUMENTS

| | | |
|---|---|---|
| JP | 3-6630 U | 1/1991 |
| JP | 2000-66076 A | 3/2000 |
| JP | 2000-214366 A | 8/2000 |
| JP | 2002-296476 A | 10/2002 |
| JP | 2003-315861 A | 11/2003 |
| JP | 2004-126029 A | 4/2004 |
| JP | 2004-252365 A | 9/2004 |
| JP | 2011-154310 A | 8/2011 |
| JP | 4817876 B2 | 11/2011 |
| JP | 2013-190475 A | 9/2013 |
| JP | 2013-238760 A | 11/2013 |
| KR | 10-2007-0043020 A | 4/2007 |

\* cited by examiner

LENS BARREL, IMAGING ELEMENT SUPPORT STRUCTURE, ELECTRONIC VIEW FINDER, AND IMAGING DEVICE

CROSS-REFERENCE TO RELATED APPLICATION(S)

This application is a continuation application, claiming the benefit under § 365(c), of an International application filed on Feb. 6, 2015 and assigned application No. PCT/KR2015/001242, which claimed the benefit of a Japanese patent application filed on Feb. 28, 2014 in the Japanese Intellectual Property Office and assigned Ser. No. 2014-038122 and of a Japanese patent application filed on Aug. 15, 2014 in the Japanese Intellectual Property Office and assigned Ser. No. 2014-165433, the disclosure of each of which is incorporated by reference herein in its entirety.

TECHNICAL FIELD

The present invention relates to a lens barrel, an imaging element support structure, an electronic viewfinder, and an imaging device.

BACKGROUND ART

A lens barrel may include a lens support frame capable of supporting an optical lens. The lens support frame may support the optical lens by providing a pin hole equidistantly in the circumferential direction of the lens support frame and fitting a pin into the pin hole from outside of the lens barrel. Also, the lens support frame may support the optical lens by providing a screw hole equidistantly in the circumferential direction of the lens support frame and screw-coupling a screw into the screw hole from outside of the lens barrel.

Also, according to the recent image quality improvement requirements, a lens barrel used in an imaging device or the like is required to increase the accuracy of a lens support frame supporting an optical lens. Accordingly, for example, Patent Document 1 discloses a lens barrel having an adjustment function for correcting the inclination and eccentricity of an optical lens that may occur due to a manufacturing error. In detail, the lens barrel disclosed in Patent Document 1 includes a lens support frame supporting an optical lens, a first through hole provided equidistantly in the circumferential direction of the lens support frame to adjust the eccentricity thereof, a first eccentric member pressed rotatably into the first through hole, a second through hole provided equidistantly in the circumferential direction of the lens support frame to adjust the inclination thereof, and a second eccentric member pressed rotatably into the second through hole. In the lens barrel disclosed in Patent Document 1, the first eccentric member may be pressed into the first through hole to adjust the eccentricity of the optical lens supported by the lens support frame, and the second eccentric member may be pressed into the second through hole to adjust the inclination of the optical lens supported by the lens support frame.

DETAILED DESCRIPTION OF THE INVENTION

Technical Problem

However, in Patent Document 1, the first through hole and the second through hole should be formed adjacent to each other in an optical-axis direction thereof, and the first through hole and the second through hole should be provided for each lens unit in the lens barrel including a plurality of lens units of a high-magnification zoom lens, a large-aperture zoom lens, or the like. Also, in the lens barrel supporting a zoom lens unit, the lens barrel should be designed such that the first through hole and the second through hole provided in each lens unit do not interfere with each other when the lens barrel moves according to the zoom. Thus, in order to design a lens barrel of a high-magnification zoom lens, a large-aperture zoom lens, or the like, the design of a lens optical system may be constrained, and the basic optical performance may be degraded or the barrel size may increase.

Technical Solution

According to a first embodiment of the present invention, a lens barrel may include: a cylindrical lens frame supporting a lens unit and having three or more groove units arranged in a circumferential direction thereof; a cylindrical frame support unit supporting the lens frame; and three or more insertion units inserted into the three or more groove units and three or more through holes formed in a circumferential direction of the frame support unit and formed to penetrate the frame support unit, wherein a plurality of openings formed at the through hole and having different opening widths may be arranged in a thincknesswise direction of the frame support unit, and two or more insertion units among the three or more insertion units may include a concentric cylinder unit arranged concentrically with respect to a pivot axis of the insertion portion and an eccentric cylinder unit arranged eccentrically with respect to the pivot axis of the insertion portion.

One or more of the plurality of openings may have an elliptical shape with a major axis parallel to an optical axis of the lens barrel, and one or more of the other openings may have an elliptical shape with a major axis parallel to the circumferential direction of the frame support unit; and any one of the opening having an elliptical shape with a major axis parallel to the optical axis of the lens barrel and the opening having an elliptical shape with a major axis parallel to the circumferential direction of the frame support unit may be arranged at an outer wall side of the frame support unit, and the other may be arranged at an inner wall side of the frame support unit.

When adjusting the eccentricity of the lens unit, the eccentric cylinder unit may be supported by the opening having an elliptical shape with a major axis parallel to the optical axis of the lens barrel among the plurality of openings included in the through hole; and when adjusting the inclination of the lens unit, the eccentric cylinder unit may be supported by the opening having an elliptical shape with a major axis parallel to the circumferential direction of the frame support unit among the plurality of openings included in the through hole.

The opening arranged at the outer wall side of the frame support unit may have a larger opening width than the opening arranged at the inner wall side of the frame support unit.

The lens barrel may further include a cylindrical support member arranged to surround the frame support unit, wherein an outer wall of the support member may include one or more opening units for attaching/detaching a dedicated tool for pivoting the insertion unit inserted into the through hole from outside of the support member.

The frame support unit may be movable in an optical-axis direction of the lens barrel; and when the lens unit is arranged at a wide end among a zoom position, the dedicated tool for adjusting the eccentricity or inclination of the lens unit may be attached/detached through the opening unit.

The frame support unit may be movable in an optical-axis direction of the lens barrel; and when the lens unit is arranged at a tele end among a zoom position, the dedicated tool for adjusting the eccentricity or inclination of the lens unit may be attached/detached through the opening unit.

According to a second embodiment of the present invention, an imaging element support structure may include: an imaging element frame supporting an imaging element and having three or more groove units arranged in a circumferential direction thereof; an imaging element frame support member supporting the imaging element frame; and three or more insertion units inserted into the three or more groove units and three or more through holes formed in a circumferential direction of the imaging element frame support member to penetrate the imaging element frame support member, wherein a plurality of openings formed at the through hole and having different opening widths may be arranged in a thicknesswise direction of the imaging element frame support member, and two or more insertion units among the three or more insertion units may include a concentric cylinder unit arranged concentrically with respect to a pivot axis of the insertion portion and an eccentric cylinder unit arranged eccentrically with respect to the pivot axis of the insertion portion.

One or more of the plurality of openings may have an elliptical shape with a major axis parallel to an optical axis of the imaging element support structure, and one or more of the other openings may have an elliptical shape with a major axis parallel to a circumferential direction of the imaging element support structure; and the opening having an elliptical shape with a major axis parallel to the optical axis of the imaging element support structure may be arranged at an outer wall of the imaging element support structure, and the opening having an elliptical shape with a major axis parallel to the circumferential direction of the imaging element support structure may be arranged at an inner wall of the imaging element support structure.

When adjusting the eccentricity of the imaging element, the eccentric cylinder unit may be supported by the opening having an elliptical shape with a major axis parallel to the optical axis of the imaging element support structure among the plurality of openings included in the through hole; and when adjusting the inclination of the imaging element, the eccentric cylinder unit may be supported by the opening having an elliptical shape with a major axis parallel to the circumferential direction of the imaging element support structure among the plurality of openings included in the through hole.

The opening arranged at an outer wall side of the imaging element frame support member may have a larger opening width than the opening arranged at an inner wall side of the imaging element frame support member.

According to a third embodiment of the present invention, an electronic viewfinder may include: a display element frame supporting a display element and having three or more groove units arranged in a circumferential direction thereof; a display element frame support member supporting the display element frame; and three or more insertion units inserted into the three or more groove units and three or more through holes arranged in a circumferential direction of the display element frame support member and formed to penetrate the display element frame support member, wherein a plurality of openings formed at the through hole and having different opening widths may be arranged in a thincknesswise direction of the display element frame support member, and two or more insertion units among the three or more insertion units may include a concentric cylinder unit arranged concentrically with respect to a pivot axis of the insertion portion and an eccentric cylinder unit arranged eccentrically with respect to the pivot axis of the insertion portion.

One or more of the plurality of openings may have an elliptical shape with a major axis parallel to an optical axis of the electronic viewfinder, and one or more of the other openings may have an elliptical shape with a major axis parallel to the circumferential direction of the display element frame support member; and any one of the opening having an elliptical shape with a major axis parallel to the optical axis of the electronic viewfinder and the opening having an elliptical shape with a major axis parallel to the circumferential direction of the display element frame support member may be arranged at an outer wall side of the display element frame support member, and the other may be arranged at an inner wall side of the display element frame support member.

When adjusting the eccentricity of the display element, the eccentric cylinder unit may be supported by the opening having an elliptical shape with a major axis parallel to the optical axis of the electronic viewfinder among the plurality of openings included in the through hole; and when adjusting the inclination of the display element, the eccentric cylinder unit may be supported by the opening having an elliptical shape with a major axis parallel to the circumferential direction of the display element frame support member among the plurality of openings included in the through hole.

The opening arranged at the outer wall side of the display element frame support member may have a larger opening width than the opening arranged at the inner wall side of the display element frame support member.

Advantageous Effects of the Invention

According to an embodiment of the present invention, it is possible to provide an imaging element support structure and an electronic viewfinder that may adjust the inclination and eccentricity of an optical element without increasing the size of a lens barrel while maintaining the design freedom of an imaging device.

DESCRIPTION OF THE DRAWINGS

The above and other aspects, features, and advantages of certain embodiments of the present disclosure will be more apparent from the following description taken in conjunction with the accompanying drawings, in which.

MODE OF THE INVENTION

Hereinafter, embodiments of the present invention will be described. However, the present invention is not limited to the following embodiments.

<First Embodiment of Present Invention>

Figure 1:
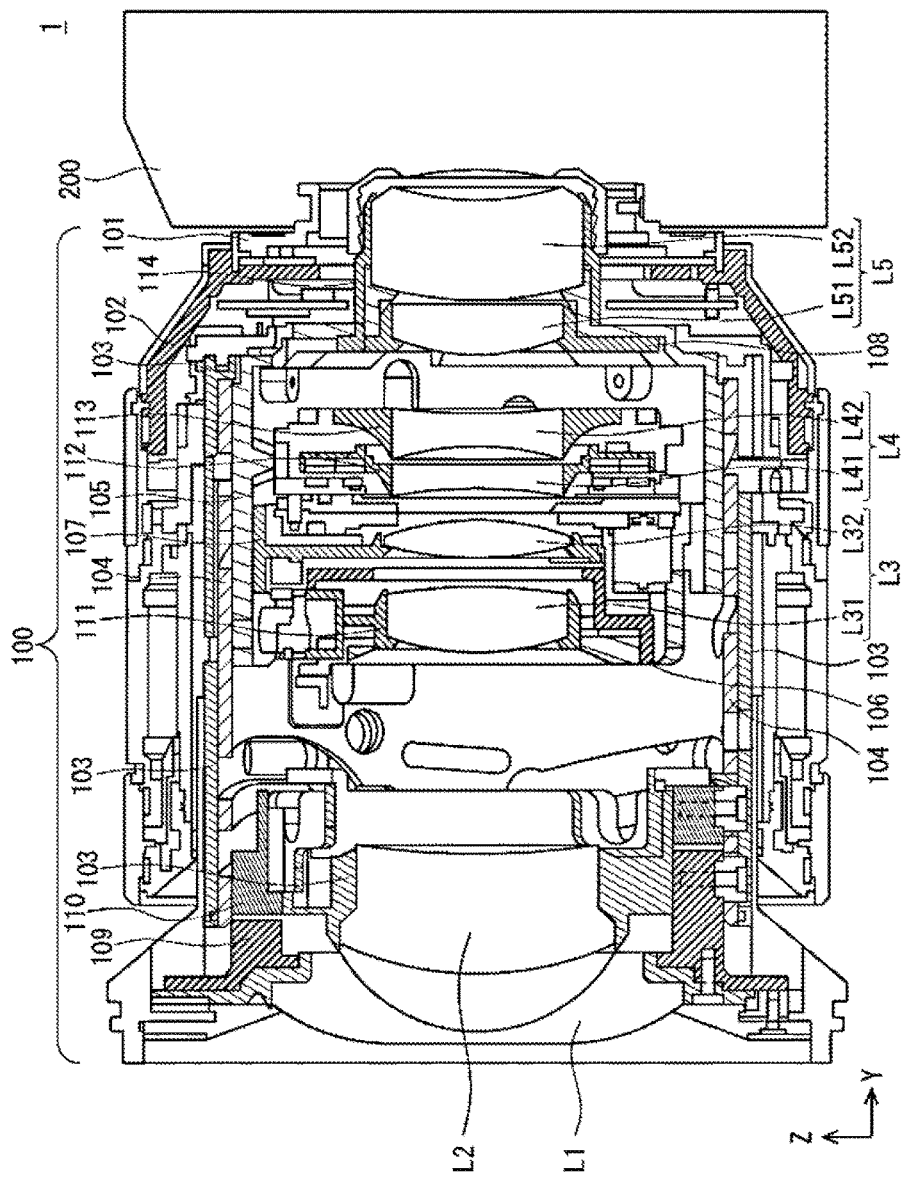
FIG. 1 is a cross-sectional view of an imaging device mounted with a lens barrel according to a first embodiment of the disclosure.

FIG. 1 is a cross-sectional view of an imaging device 1 mounted with a lens barrel 100 according to a first embodiment of the present invention. In the first embodiment of the present invention, a horizontal direction of the imaging device 1 corresponds to an X axis, an optical-axis direction of the imaging device 1 corresponds to a Y axis, and a vertical direction of the imaging device 1 corresponds to a Z axis.

Referring to FIG. 1, the imaging device 1 may include a lens barrel 100 and a main body unit 200. The main body unit 200 may include an imaging element such as a charge-coupled device (CCD) or a complementary metal-oxide semiconductor (CMOS).

In the lens barrel 100, a first lens unit L1, a second lens unit L2, a third lens unit L3, a fourth lens unit L4, and a fifth lens unit L5 may be sequentially arranged along an optical axis thereof. Each of the first lens unit L1, the second lens unit L2, the third lens unit L3, the fourth lens unit L4, and the fifth lens unit L5 may include one or more optical lens units. However, an optical element arranged in the lens barrel 100 is not limited to an optical lens unit, and for example, a filter member or a diffractive optical member may be arranged therein.

The third lens unit L3 may include a (3-1)th lens unit L31 and a (3-2)th lens unit L32 in the optical-axis direction. The fourth lens unit L4 may include a (4-1)th lens unit L41 and a (4-2)th lens unit L42 in the optical-axis direction. The fifth lens unit L5 may include a (5-1)th lens unit L51 and a (5-2)th lens unit L52 in the optical-axis direction.

Although a lens configuration of each lens unit is described herein in brief, the present invention is not limited thereto. When a zoom function is executed in the imaging device 1, the first lens unit L1, the second lens unit L2, the third lens unit L3, the fourth lens unit L4, and the fifth lens unit L5 may move in the optical-axis direction of the imaging device 1.

Also, when a zoom function is executed in the imaging device 1, the third lens unit L3 and the fifth lens unit L5 may move together in the optical-axis direction of the imaging device 1.

Also, when a focus function is executed in the imaging device 1, the (3-1)th lens unit L31 may move in the optical-axis direction of the imaging device 1.

Also, the (4-1)th lens unit L41 may move in a direction perpendicular to the optical axis of the imaging device 1 to compensate the vibration of the imaging device 1.

The lens barrel 100 may include a mount unit 101, a fixing unit 102, a guide tube 103, a cam tube 104, a frame support unit 105, a first lens frame 106, a second lens frame 107, a third lens frame 108, a first lens support unit 109, a second lens support unit 110, a third lens support unit 111, a fourth lens support unit 112, a fifth lens support unit 113, and a sixth lens support unit 114.

The mount unit 101, the fixing unit 102, the guide tube 103, the cam tube 104, the frame support unit 105, the first lens frame 106, the second lens frame 107, the third lens frame 108, the first lens support unit 109, the second lens support unit 110, the third lens support unit 111, the fourth lens support unit 112, the fifth lens support unit 113, and the sixth lens support unit 114 may be formed in a substantially cylindrical shape. The mount unit 101 may be coupled to the fixing unit 102 by using a screw unit (not illustrated) formed at one side, for example, a subject side. Also, the mount unit 101 may be coupled to the main body unit 200 by using a bayonet unit formed at the other side, for example, the side of the main body unit 200.

The fixing unit 102 may be coupled to the guide tube 103 by a screw unit (not illustrated). Accordingly, the guide tube 102 may couple the cam tube 104, the frame support unit 105, the first lens frame 106, the second lens frame 107, the third lens frame 108, the first lens support unit 109, the second lens support unit 110, the third lens support unit 111, the fourth lens support unit 112, the fifth lens support unit 113, and the sixth lens support unit 114 with respect to the main body unit 200.

The guide tube 103 may include an opening unit 103A (see FIG. 11) for attaching/detaching a dedicated tool (not illustrated) for pivoting a first insertion unit 301 and a second insertion unit 302 (see FIG. 2) from an outer wall of the guide tube 103.

Also, the guide tube 103 may include a guide groove 103B (see FIG. 11) extended in the optical-axis direction.

The cam tube 104 may be pivotably coupled to an inner wall of the guide tube 103 with a pivot axis corresponding to the optical axis. Also, the cam tube 104 may include a cam groove 104B (see FIG. 11).

The overlap position between the cam groove 104B and the guide groove 103B may be changed according to the pivot of the cam tube 104. Accordingly, the first lens unit L1, the second lens unit L2, the fourth lens unit L4, the frame support unit 105 supporting the third lens unit L3 and the fifth lens unit L5 may be moved in the optical-axis direction.

Also, the cam tube 104 may include an opening unit 104A for attaching/detaching a dedicated tool (not illustrated) for pivoting the first insertion unit 301 and the second insertion unit 302 (see FIG. 2) from an outer wall of the cam tube 104.

The first lens frame 106, the second lens frame 107, and the third lens frame 108 may be coupled to an inner wall of the frame support unit 105. Also, a subject side portion of the sixth lens support unit 114 may be coupled to an upper side of the frame support unit 105. The third lens support unit 111 supporting the (3-1)th lens unit L31 may be coupled to an inner wall of the first lens frame 106. Also, the second lens frame 107 may support the (3-2)th lens unit L32. Also, the third lens frame 108 may support the (5-1)th lens unit L51. Also, the sixth lens support unit 114 may support the (5-2)th lens unit L52.

Accordingly, the frame support unit 105 may integrally support the third lens unit L3 and the fifth lens unit L5. Also, the third lens unit L3 and the fifth lens unit L5 may be integrally moved in the optical-axis direction according to the pivot of the cam tube 104 and the movement of the frame support unit 105 in the optical-axis direction.

The first lens frame 106 may be coupled to the frame support unit 105 to move in the optical-axis direction. Also, as described above, the first lens frame 106 may support the (3-1)th lens unit L31 with the third lens support unit 111 therebetween. Thus, when a focus operation is executed in the imaging device 1, the (3-1)th lens unit L31 may be moved in the optical-axis direction of the imaging device 1.

The first lens support unit 109 may be coupled to the cam tube 104 by using a screw unit. Also, the first lens support unit 109 may support the first lens unit L1. Thus, the first lens unit L1 may be moved in the optical-axis direction according to the pivot of the cam tube 104.

The second lens support unit 110 may be coupled to the cam tube 104 by using a screw unit. Also, the second lens support unit 110 may support the second lens unit L2. Thus, the second lens unit L2 may be moved in the optical-axis direction according to the pivot of the cam tube 104.

The fourth lens support unit 112 may be coupled to the cam tube 104. Also, the fourth lens support unit 112 may support the (4-1)th lens unit L41.

The fifth lens support unit 113 may be coupled to the cam tube 104. Also, the fifth lens support unit 113 may support the (4-2)th lens unit L42.

Accordingly, the fourth lens unit L4 may be moved in the optical-axis direction by the pivot of the cam tube 104.

Also, the fourth lens support unit 112 may be coupled to the cam tube 104 to move in the direction perpendicular to the optical axis. Also, as described above, the fourth lens support unit 112 may support the (4-1)th lens unit L41. Accordingly, the (4-1)th lens unit L41 may be moved in the direction perpendicular to the optical axis, and thus the vibration of the imaging device 1 may be compensated.

Figure 2:
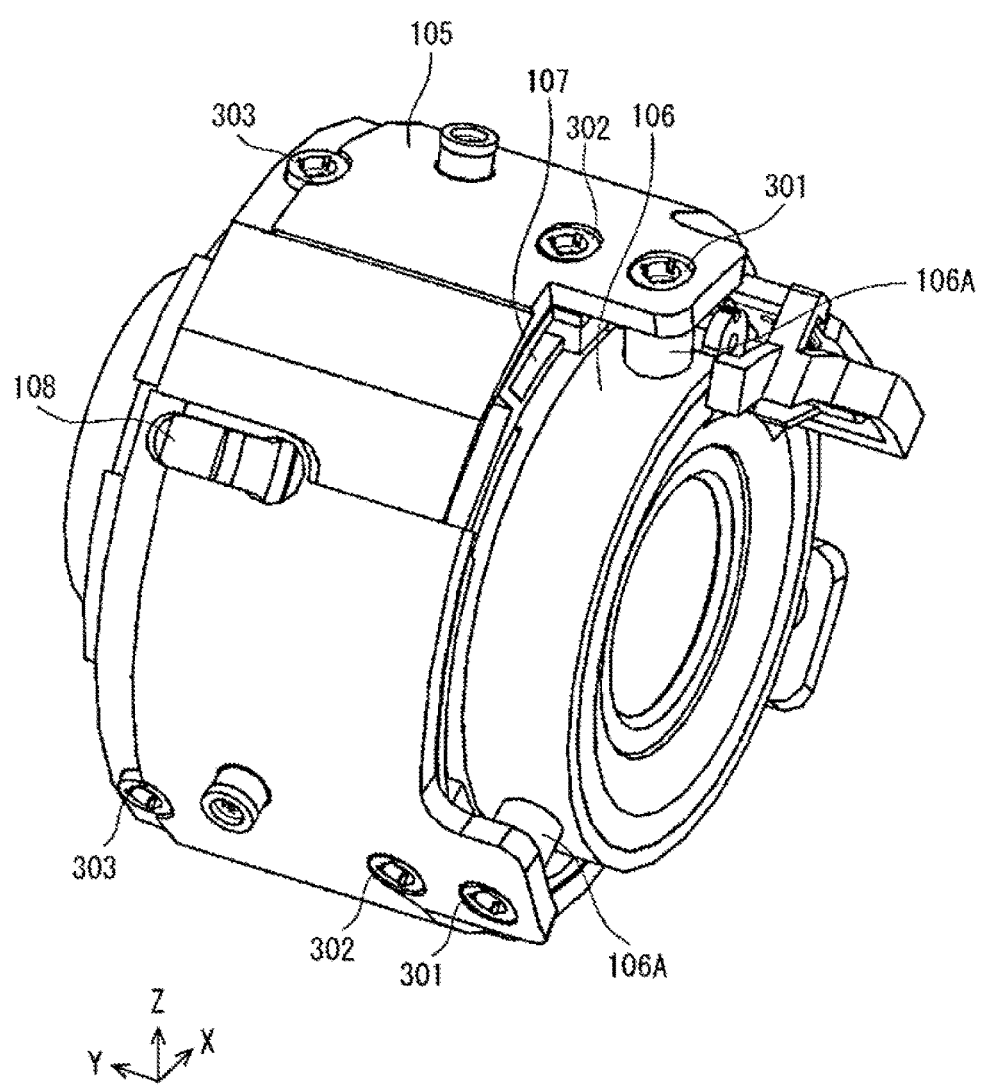
FIG. 2 is a partial perspective view of a lens barrel according to the first embodiment of the disclosure.
Figure 3:
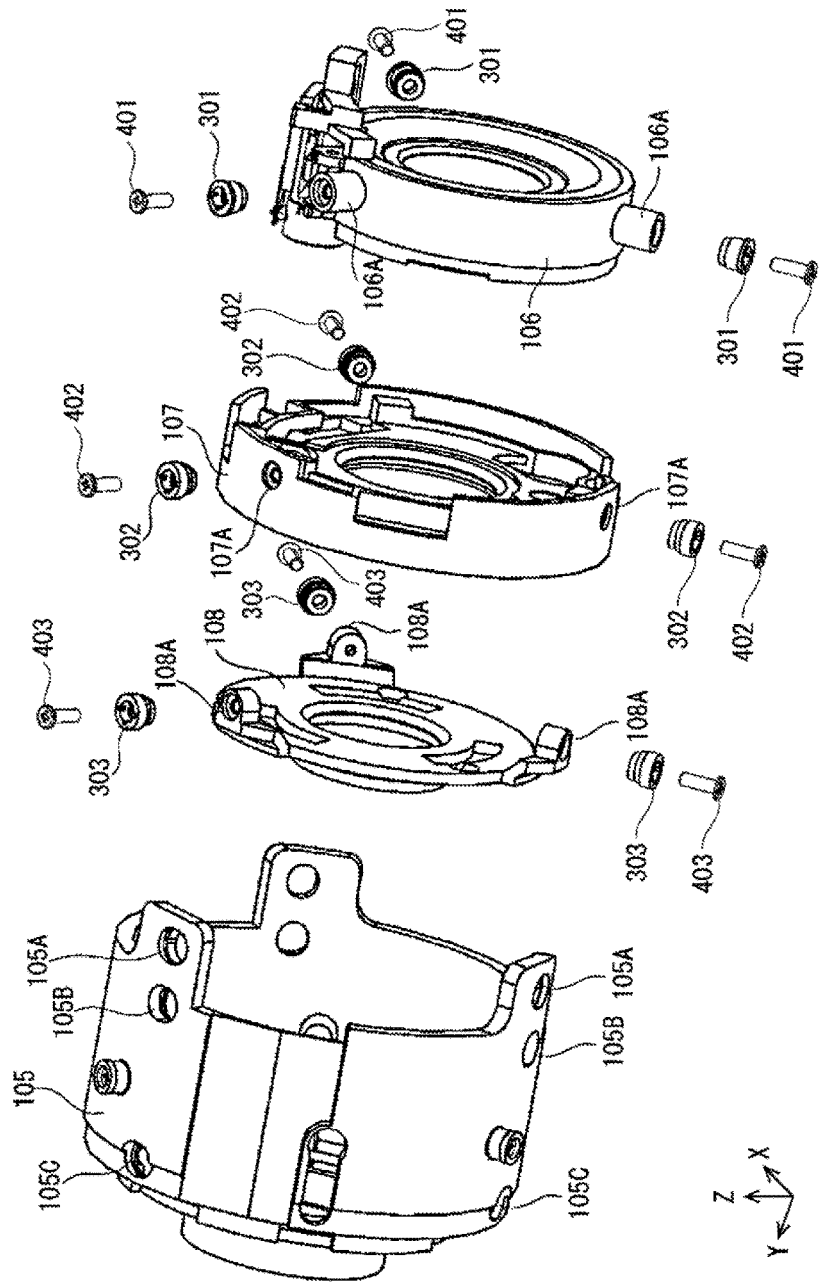
FIG. 3 is an exploded perspective view of a lens barrel according to the first embodiment of the disclosure.

FIG. 2 is a partial perspective view of a lens barrel 100 according to an embodiment of the present invention. FIG. 3 is an exploded perspective view of the lens barrel 100 illustrated in FIG. 2.

Referring to FIGS. 2 and 3, the frame support unit 105 may support the first lens frame 106, the second lens frame 107, the third lens frame 108, the third lens unit L3, and the (5-1)th lens unit L51. As described above, the first lens frame 106, the second lens frame 107, and the third lens frame 108 may be coupled to the inner wall of the frame support unit 105.

The frame support unit 105 may include three or more through holes (e.g., a first through hole 105A, a second through hole 105B, and a third through hole 105C) arranged in the circumferential direction of the frame support unit 105 and formed to penetrate an outer wall of the frame support unit 105. As an example, in the first embodiment of the present invention, three first through holes 105A may be arranged equidistantly in the circumferential direction of the frame support unit 105. Also, three second through holes 105B may be arranged equidistantly in the circumferential direction of the frame support unit 105. Also, three third through holes 105C may be arranged equidistantly in the circumferential direction of the frame support unit 105. In this case, the second through hole 105B may be arranged on the side of the main body unit 200 in comparison with the first through hole 105A, and the third through hole 105C may be arranged on the side of the main body unit 200 in comparison with the second through hole 105B.

The first lens frame 106 may include three or more first groove units 106A formed in the circumferential direction of the first lens frame 106. In this case, the first groove unit 106A formed at the first lens frame 106 may be arranged to overlap the first through hole 105A formed at the frame support unit 105. As an example, according to the first embodiment of the present invention, three first groove units 106A may be arranged equidistantly in the circumferential direction of the first lens frame 106.

The second lens frame 107 may include three or more second groove units 107A formed in the circumferential direction of the second lens frame 107. In this case, the second groove unit 107A formed at the second lens frame 107 may be arranged to overlap the second through hole 105B formed at the frame support unit 105. As an example, according to the first embodiment of the present invention, three second groove units 107A may be arranged equidistantly in the circumferential direction of the second lens frame 107. The third lens frame 108 may include three or more third groove units 108A formed in the circumferential direction of the third lens frame 108. In this case, the third groove unit 108A formed at the third lens frame 108 may be arranged to overlap the third through hole 105C formed at the frame support unit 105. As an example, according to the first embodiment of the present invention, three third groove units 108A may be arranged equidistantly in the circumferential direction of the third lens frame 108.

The first lens frame 106 may be coupled to the inner wall of the frame support unit 105 when the first insertion unit 301 is coupled to the first through hole 105A of the frame support unit 105 and the first groove unit 106A of the first lens frame 106 by using a first screw 401.

The second lens frame 107 may be coupled to the inner wall of the frame support unit 105 when the second insertion unit 302 is coupled to the second through hole 105B of the frame support unit 105 and the second groove unit 107A of the second lens frame 107 by using a second screw 402.

The third lens frame 108 may be coupled to the inner wall of the frame support unit 105 when the third insertion unit 303 is coupled to the third through hole 105C of the frame support unit 105 and the third groove unit 108A of the third lens frame 108 by using a third screw 403.

Accordingly, the third lens unit L3 and the (5-1)th lens unit L51 may be indirectly supported by the frame support unit 105.

Figure 4:
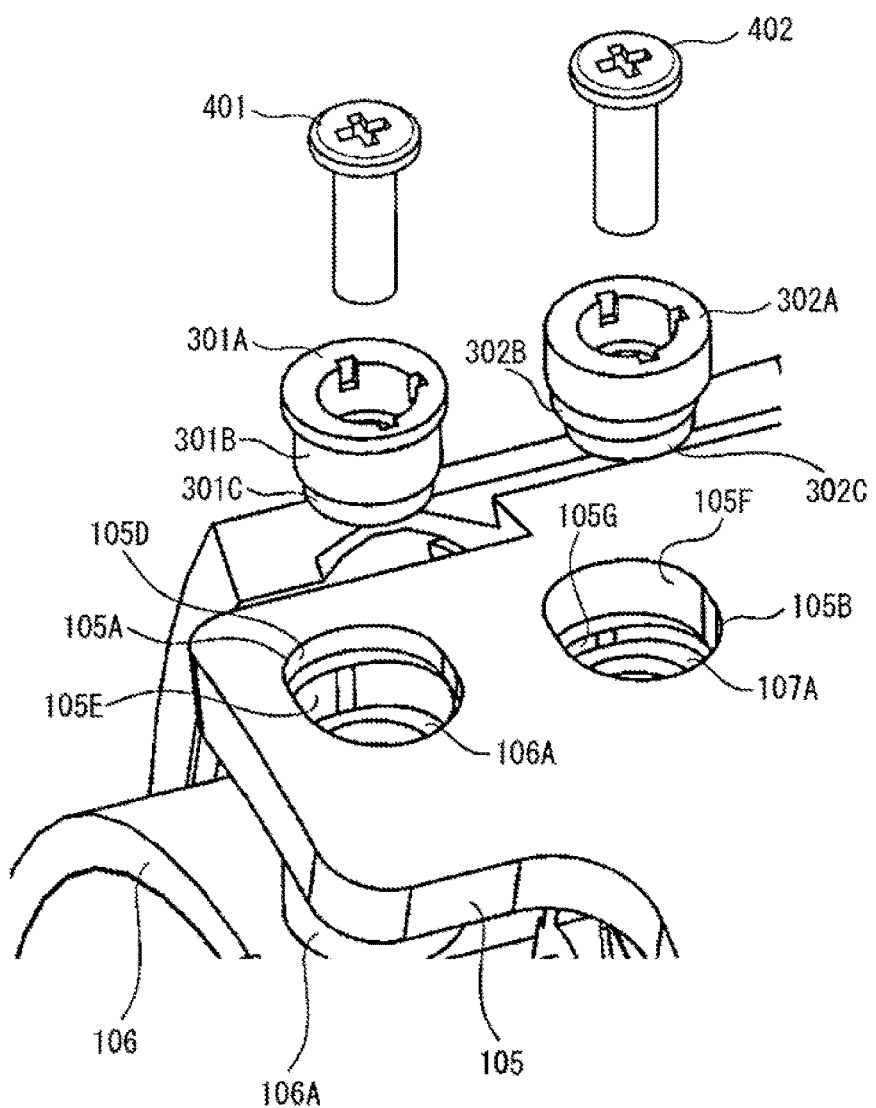
FIG. 4 is an exploded perspective view of a portion of a lens barrel according to the first embodiment of the disclosure.
Figure 5:
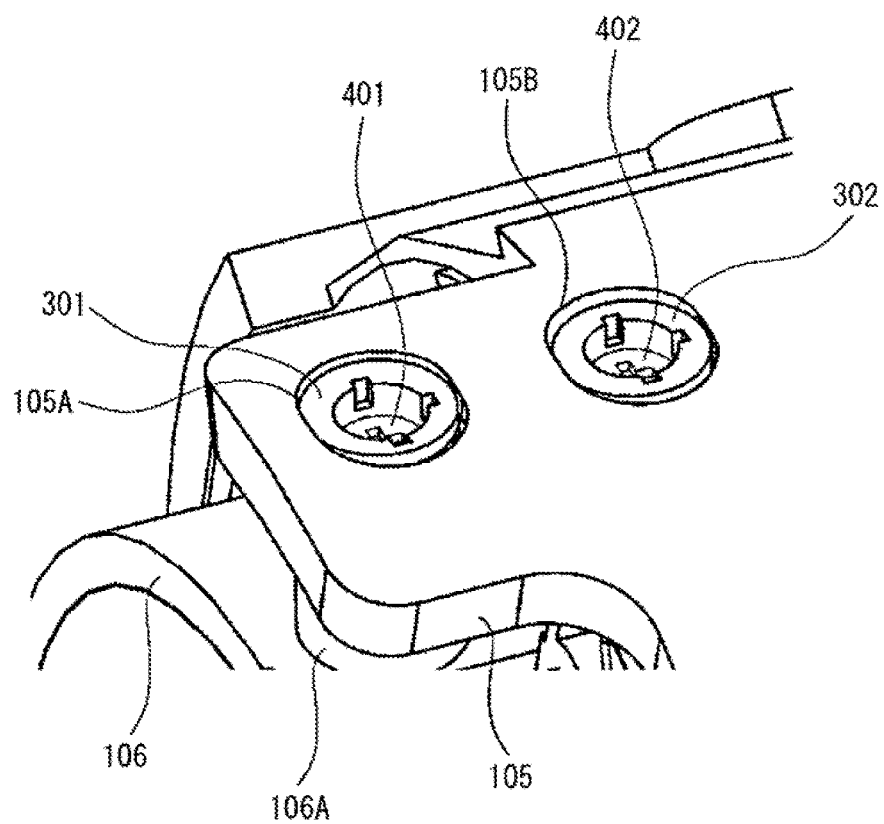
FIG. 5 is an assembled perspective view of a portion of a lens barrel as illustrated in FIG. 4.
Figure 6:
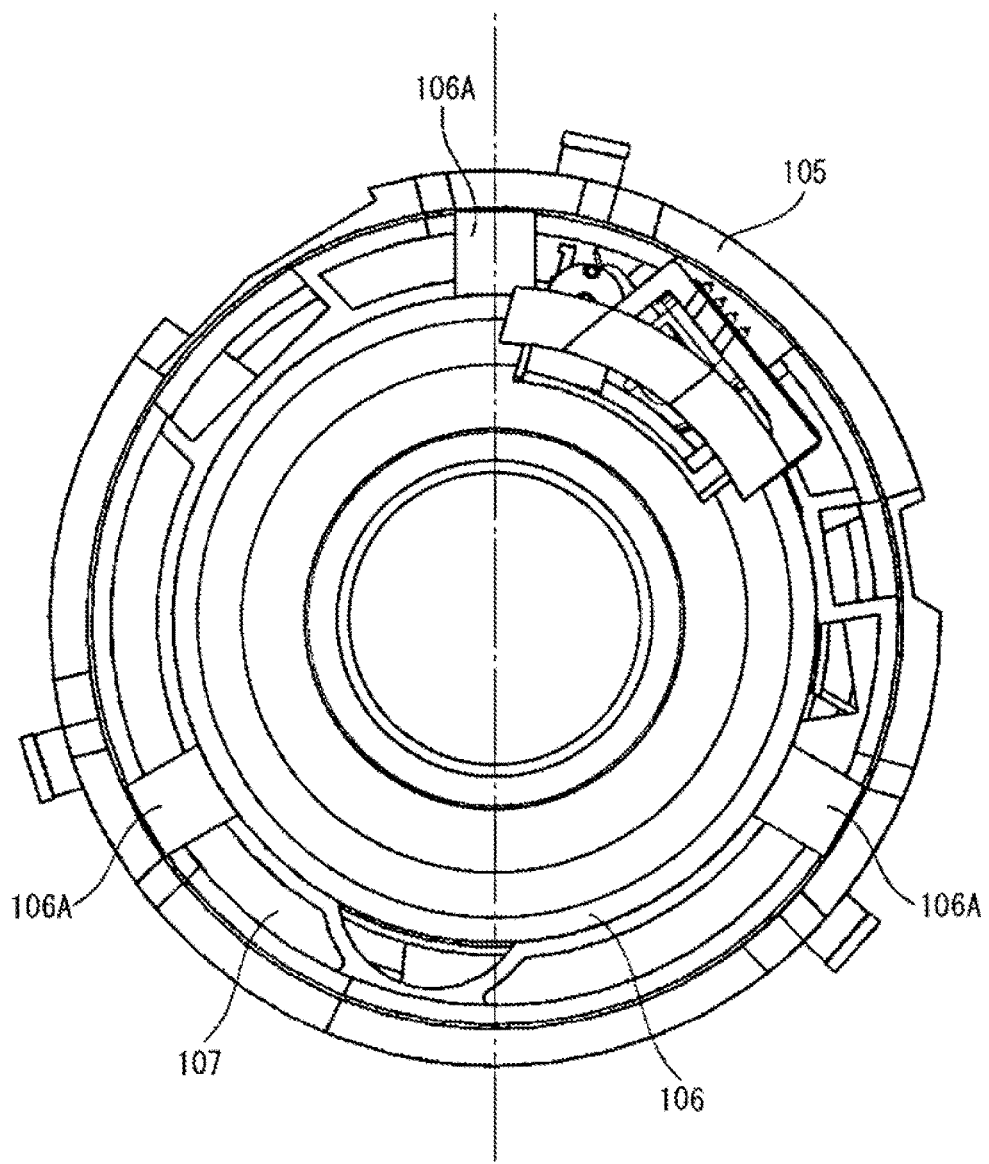
FIG. 6 is a front view of a portion of a lens barrel according to the first embodiment of the disclosure.
Figure 7:
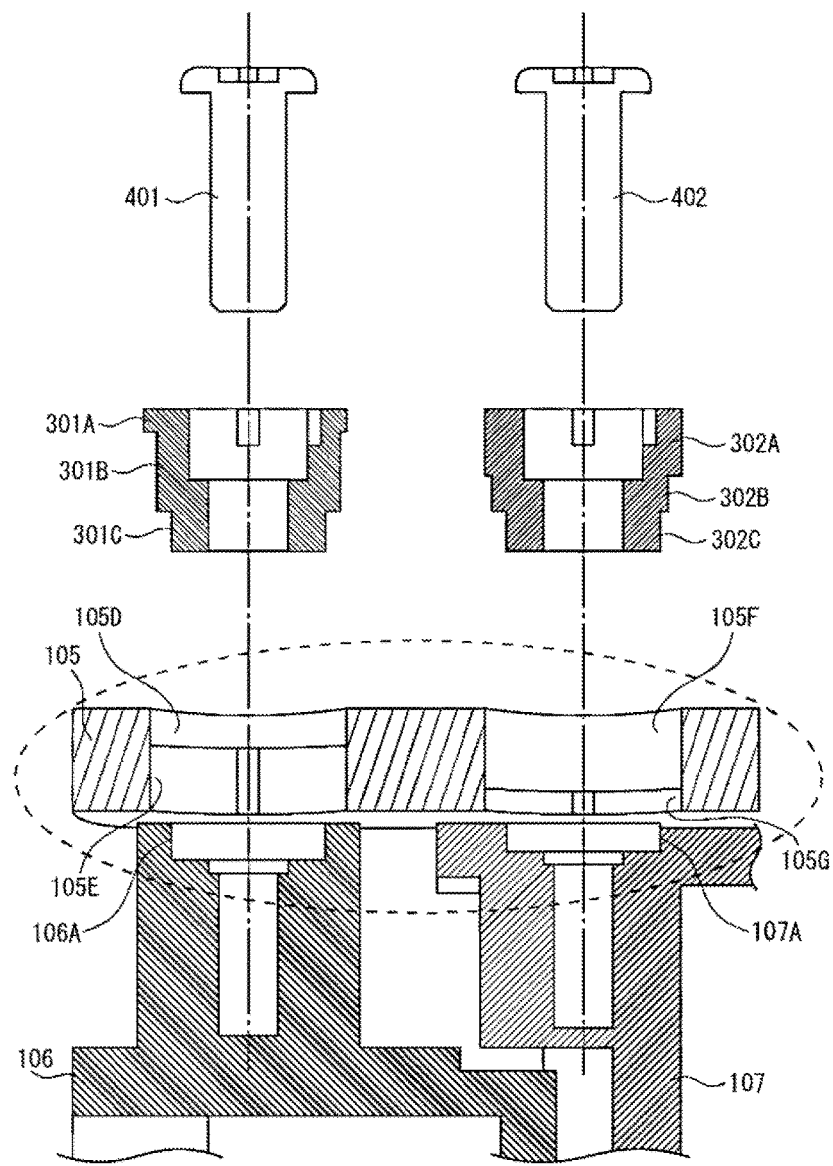
FIG. 7 is an exploded cross-sectional view of a portion of a lens barrel according to the first embodiment of the disclosure.
Figure 8:
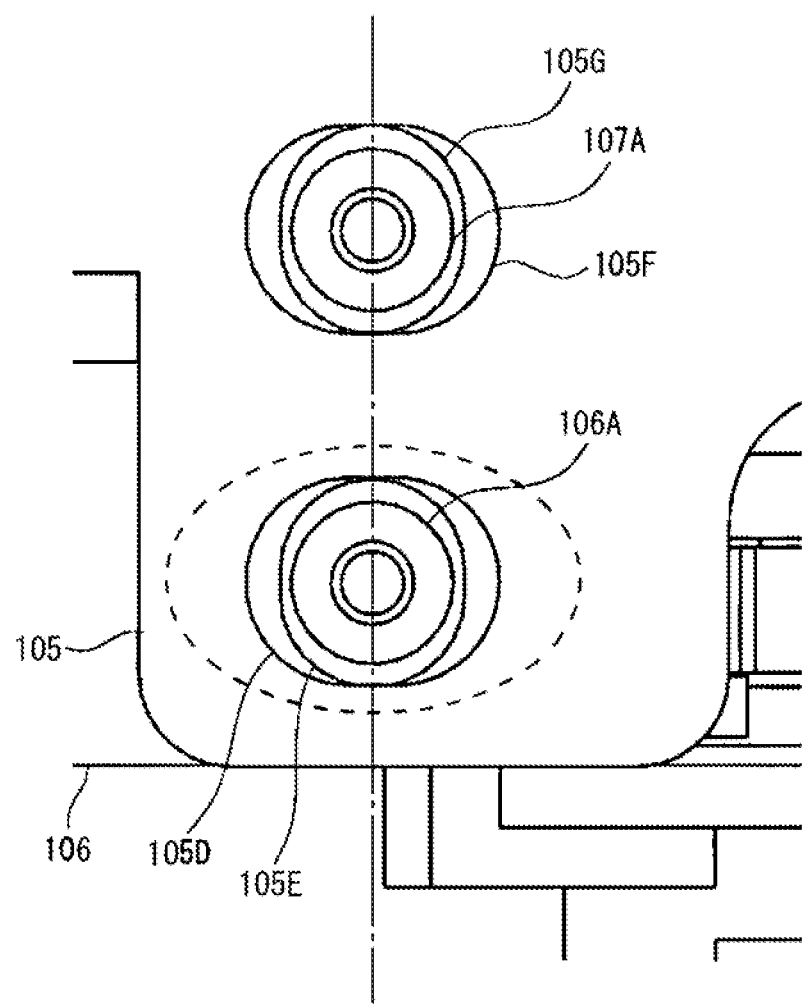
FIG. 8 is a top view of a portion of a lens barrel according to the first embodiment of the disclosure.
Figure 9:
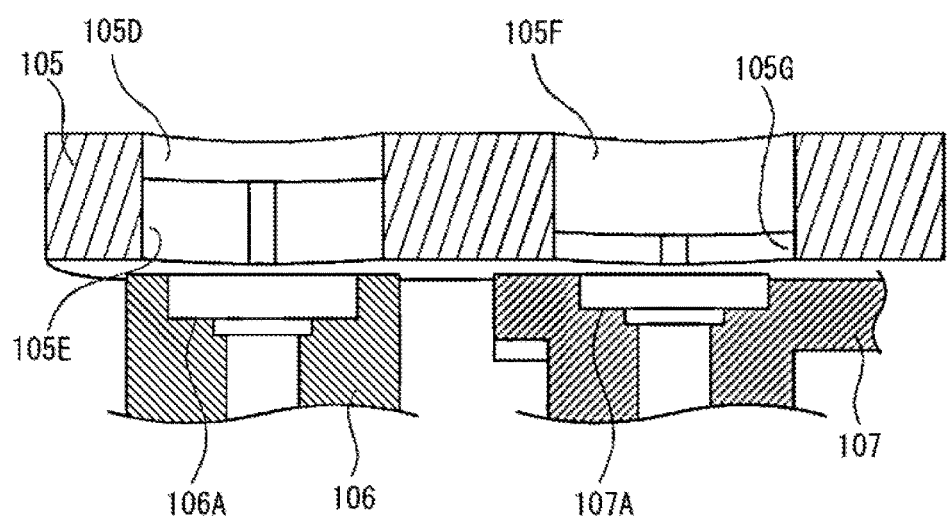
FIG. 9 is an enlarged cross-sectional view of a portion indicated by a dotted line in FIG. 7.
Figure 10:
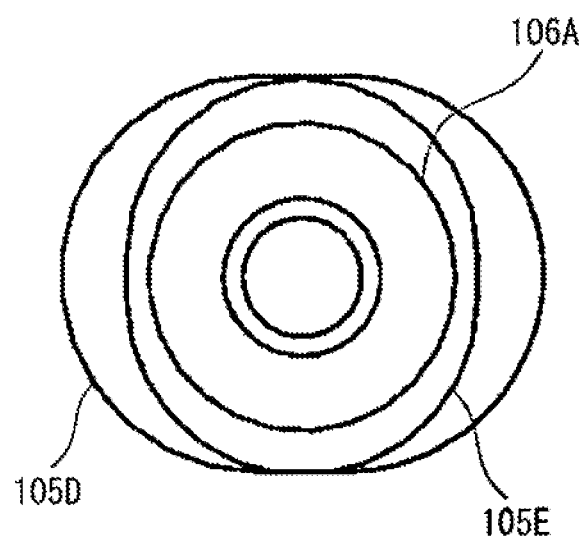
FIG. 10 is an enlarged top view of a portion indicated by a dotted line in FIG. 8.

FIG. 4 is an exploded perspective view of the first through hole 105A and the second through hole 105B of the frame support unit 105, the first insertion unit 301, the second insertion unit 302, the first screw 401, and the second screw 402 according to an embodiment of the present invention. FIG. 5 is an assembled perspective view of the first through hole 105A and the second through hole 105B of the frame support unit 105, the first insertion unit 301, the second insertion unit 302, the first screw 401, and the second screw 402 illustrated in FIG. 4. FIG. 6 is a front view illustrating a state of the first lens frame 106 and the second lens frame 107 being coupled to the frame support unit 105. FIG. 7 is an exploded cross-sectional view of the first groove unit 106A of the first lens frame 106, the second groove unit 107A of the second lens frame 107, the first through hole 105A and the second through hole 105B of the frame support unit 105, the first insertion unit 301, the second insertion unit 302, the first screw 401, and the second screw 402. FIG. 8 is a top view of the first through hole 105A and the second through hole 105B. FIG. 9 is an enlarged cross-sectional view of a portion surrounded by a dotted line in FIG. 7. FIG. 10 is an enlarged top view of a portion surrounded by a dotted line in FIG. 8.

A position indicated by a dot-dash line in FIG. 8 may correspond to a position indicated by a dot-dash line in FIG. 6. Also, dot-dash lines in FIG. 7 represent pivot axes of the first insertion unit 301 and the second insertion unit 302. Referring to FIGS. 4 and 7 to 10, at the first through hole 105A, a plurality of openings (e.g., a first opening 105D and a second opening 105E) having different opening widths may be formed in the thincknesswise direction of the frame support unit 105. At the second through hole 105B, a plurality of openings (e.g., a third opening 105F and a fourth opening 105G) having different opening widths may be formed in the thincknesswise direction of the frame support unit 105. However, the number of openings formed at the first through hole 105A and the number of openings formed at the second through hole 105B are not limited to two, and three or more openings may be formed at each of the first through hole 105A and the second through hole 105B.

Also, the first opening 105D and the third opening 105F located at the outer wall of the frame support unit 105 may be formed in parallel to the circumferential direction of the frame support unit 105, and the second opening 105E and the fourth opening 105G located at the inner wall of the frame support unit 105 may be formed in parallel to the optical-axis direction of the lens barrel 100. Referring to FIGS. 8 and 10, at least one opening (e.g., the first opening 105D) among the first opening 105D and the second opening 105E formed at the first through hole 105A may be formed in parallel to the circumferential direction of the frame support unit 105, and at least one other opening (e.g., the second opening 105E) may be formed in parallel to the optical-axis direction of the lens barrel 100. Also, at least one opening (e.g., the third opening 105F) among the third opening 105F and the fourth opening 105G formed at the second through hole 105B may be formed in parallel to the circumferential direction of the frame support unit 105, and at least one other opening (e.g., the fourth opening 105G) may be formed in parallel to the optical-axis direction of the lens barrel 100.

In other words, each of the first opening 105D, the second opening 105E, the third opening 105F, and the fourth opening 105G is elliptical in plan view. The first opening 105D and the third opening 105F formed at the frame support unit 105 may have an elliptical shape with a major axis parallel to the circumferential direction of the frame support unit 105, and the second opening 105E and the fourth opening 105G formed at the frame support unit 105 may have an elliptical shape with a major axis parallel to the optical axis of the lens barrel 100.

Referring to FIGS. 8 and 10, the first opening 105D located at the outer wall of the frame support unit 105 may have a larger opening width than the second opening 105E located at the inner wall of the frame support unit 105. Also, the third opening 105F located at the outer wall of the frame support unit 105 may have a larger opening width than the fourth opening 105G located at the inner wall of the frame support unit 105. In other words, the second opening 105E may have a smaller opening area than the first opening 105D. Also, the fourth opening 105G may have a smaller opening area than the third opening 105F.

Accordingly, the first through hole 105A and the second through hole 105B may be formed from the outer wall of the frame support unit 105. The frame support unit 105 including the first through hole 105A and the second through hole 105B may be molded by injection molding of outer slide core method. However, the present invention is not limited thereto, and the first opening 105D may have a smaller opening width than the second opening 105E. In other words, an opening unit of the first opening 105D and an opening unit of the second opening 105E may partially overlap each other. Also, an opening unit of the third opening 105F and an opening unit of the fourth opening 105G may partially overlap each other.

At least two of three or more first insertion units 301 inserted respectively into three or more first through holes 105A arranged in the circumferential direction of the frame support unit 105 may include a first cylinder unit 301A (an eccentric cylinder unit) and a second cylinder unit 301B (a concentric cylinder unit). Also, at least two of three or more second insertion units 302 inserted respectively into three or more second through holes 105B arranged in the circumferential direction of the frame support unit 105 may include a first cylinder unit 302A (a concentric cylinder unit) and a second cylinder unit 302B (an eccentric cylinder unit).

The first cylinder unit 301A may be formed eccentrically with respect to the pivot axis of the first insertion unit 301, and the second cylinder unit 301B may be formed concentrically with respect to the pivot axis of the first insertion unit 301.

Also, the first cylinder unit 302A may be formed concentrically with respect to the pivot axis of the second insertion unit 302, and the second cylinder unit 302B may be formed eccentrically with respect to the pivot axis of the second insertion unit 302.

As an example, three first insertion units 301 may include a first cylinder unit 301A, a second cylinder unit 301B, and a third cylinder unit 301C. The first cylinder unit 301A, the second cylinder unit 301B, and the third cylinder unit 301C included in the first insertion unit 301 may be arranged to be sequentially inserted into the first through hole 105A. In other words, when the first insertion unit 301 is inserted into the first through hole 105A, the outer wall of the first cylinder unit 301A may contact the inner wall of the first opening 105D of the first through hole 105A. When the first insertion unit 301 is inserted into the first through hole 105A, the outer wall of the second cylinder unit 301B may contact the inner wall of the second opening 105E of the first through hole 105A. Also, when the first insertion unit 301 is inserted into the first through hole 105A, the outer wall of the third cylinder unit 301C may contact the inner wall of the first groove unit 106A of the first lens frame 106.

Three second insertion units 302 may include a fourth cylinder unit 302A, a fifth cylinder unit 302B, and a sixth cylinder unit 302C. The fourth cylinder unit 302A, the fifth cylinder unit 302B, and the sixth cylinder unit 302C may be arranged to be sequentially inserted into the second through hole 105B. In other words, when the second insertion unit 302 is inserted into the second through hole 105B, the outer wall of the fourth cylinder unit 302A may contact the inner wall of the third opening 105F of the second through hole 105B. Also, when the second insertion unit 302 is inserted into the second through hole 105B, the outer wall of the fifth cylinder unit 302B may contact the inner wall of the fourth opening 105G of the second through hole 105B. Also, when the second insertion unit 302 is inserted into the second through hole 105B, the outer wall of the sixth cylinder unit 302C may contact the inner wall of the second groove unit 107A of the second lens frame 107.

When the first insertion unit 301 is inserted into the first through hole 105A, the outer wall of the first cylinder unit 301A arranged eccentrically with respect to the pivot axis of the first insertion unit 301 may contact the inner wall of the first opening 105D formed in parallel to the circumferential direction of the frame support unit 105. In a case where the coupling between the first through hole 105A and the first insertion unit 301 by the first screw 401 is loosened, when the first insertion unit 301 is pivoted by using a dedicated tool (not illustrated), the first lens frame 106 may be inclined in the optical-axis direction of the lens barrel 100. The inclination of the first lens frame 106 with respect to the optical axis of the lens barrel 100 may be adjusted by pivoting the first insertion unit 301 inserted into each of the three first through holes 105A provided equidistantly in the circumferential direction of the frame support unit 105. In other words, the inclination of the (3-1)th lens unit L31 may be adjusted by pivoting the first insertion unit 301 inserted into each of the three first through holes 105A provided in the circumferential direction of the frame support unit 105.

The first cylinder unit 301A arranged eccentrically with respect to the pivot axis of the first insertion unit 301 may have a smaller height than the second cylinder unit 301B arranged concentrically with respect to the pivot axis of the first insertion unit 301. Accordingly, when the first insertion unit 301 inserted into the first through hole 105A is pivoted, a stress that may be generated between the first opening 105D of the first through hole 105A and the first cylinder unit 301A eccentricated with respect to the pivot axis may be suppressed to a minimum.

In the first embodiment of the present invention, in order to correspond to the height of the first cylinder unit 301A and the height of the second cylinder unit 301B, the depth of the first opening 105D of the first through hole 105A may be smaller than the depth of the second opening 105E. Accordingly, when the first insertion unit 301 inserted into the first through hole 105A is pivoted, a stress that may be generated between the first opening 105D and the first cylinder unit 301A may be suppressed to a minimum.

However, the depth of the first opening 105D included in the first through hole 105A may be substantially equal to the depth of the second opening 105E. As an example, when the depth of the first opening 105D is substantially equal to the depth of the second opening 105E, the second insertion unit 302 may also be pivoted while being inserted into the first through hole 105A. In this case, the outer wall of the second cylinder unit 302B included in the second insertion unit 302 and arranged eccentrically with respect to the pivot axis may be pivoted while contacting the inner wall of the second opening 105E formed in parallel to the optical axis, and the eccentricity of the first lens frame 106 may be adjusted accordingly. Thus, both the eccentricity and inclination of the first lens frame 106 may be adjusted by providing three or more first through holes 105A at certain positions in the circumferential direction of the frame support unit 105. In other words, both the eccentricity and inclination of the (3-1)th lens unit L31 may be adjusted by pivoting an insertion unit including at least one cylinder unit arranged eccentrically with respect to the pivot axis while inserting the insertion unit into the three or more first through holes 105A provided at certain positions in the circumferential direction of the frame support unit 105.

When the second insertion unit 302 is inserted into the second through hole 105B, the outer wall of the second cylinder unit 302B arranged eccentrically with respect to the pivot axis of the second insertion unit 302 may contact the inner wall of the fourth opening 105G formed in parallel to the optical-axis direction of the lens barrel 100. When the coupling between the second through hole 105B and the second insertion unit 302 by the second screw 402 is loosened, the second lens frame 107 may be eccentricated with respect to the optical axis of the lens barrel 100 by pivoting the second insertion unit 302 by using a dedicated tool. The eccentricity of the second lens frame 107 with respect to the optical axis of the lens barrel 100 may be adjusted by pivoting the second insertion unit 302 inserted into each of the three second through holes 105B provided equidistantly in the circumferential direction of the frame support unit 105. In other words, the eccentricity of the (3-2)th lens unit L32 may be adjusted by pivoting the second insertion unit 302 inserted into each of the three second through holes 105B provided in the circumferential direction of the frame support unit 105.

The second cylinder unit 302B arranged eccentrically with respect to the pivot axis of the second insertion unit 302 may have a smaller height than the first cylinder unit 302A arranged concentrically with respect to the pivot axis of the second insertion unit 302. Accordingly, when the second insertion unit 302 inserted into the first through hole 105B is pivoted, a stress that may be generated between the fourth opening 105G of the second through hole 105B and the second cylinder unit 302B arranged eccentrically with respect to the pivot axis may be suppressed to a minimum.

According to the first embodiment of the present invention, in order to correspond to the height of the first cylinder unit 302A and the height of the second cylinder unit 302B, the depth of the fourth opening 105G of the second through hole 105B may be smaller than the depth of the third opening 105F. Accordingly, when the second insertion unit 302 inserted into the first through hole 105B is pivoted, a stress that may be generated between the fourth opening 105G and the second cylinder unit 302B may be suppressed to a minimum.

However, the depth of the fourth opening 105G of the second through hole 105B may be formed to be substantially equal to the depth of the third opening 105F. When the depth of the fourth opening 105G is substantially equal to the depth of the third opening 105F, the eccentricity of the second lens frame 107 may be adjusted by pivoting an insertion unit, in which the outer wall of the first cylinder unit 301A arranged eccentrically with respect to the pivot axis contacts the inner wall of the third opening 105F formed in parallel to the circumferential direction of the frame support unit 105, while inserting the insertion unit into the second through hole 105B. Thus, both the eccentricity and inclination of the second lens frame 107 may be adjusted by providing three or more second through holes 105B at certain positions in the circumferential direction of the frame support unit 105. In other words, both the eccentricity and inclination of the (3-2)th lens unit L32 may be adjusted by pivoting an insertion unit including at least one cylinder unit arranged eccentrically with respect to the pivot axis while inserting the insertion unit into the three or more second through holes 105B provided at certain positions in the circumferential direction of the frame support unit 105.

The first cylinder unit 301A may be arranged concentrically with respect to the pivot axis of the first insertion unit 301, and the second cylinder unit 302B may not be arranged concentrically with respect to the pivot axis of the second insertion unit 302. In other words, the first cylinder unit 301A, the second cylinder unit 301B, and the third cylinder unit 301C may be arranged concentrically with respect to the pivot axis of the first insertion unit 301. The first cylinder unit 302A, the second cylinder unit 302B, and the third cylinder unit 302C may be arranged concentrically with respect to the pivot axis of the second insertion unit 302. However, in this case, the eccentricity and inclination of the (3-1)th lens unit L31 may not be adjusted even by pivoting the first insertion unit 301 while inserting the first insertion unit 301 into the first through hole 105A. Also, the eccentricity and inclination of the (3-2)th lens unit L32 may not be adjusted even by pivoting the second insertion unit 302 while inserting the second insertion unit 302 into the second through hole 105B.

However, the eccentricity and inclination of the (3-1)th lens unit L31 and the (3-2)th lens unit L32 may be adjusted by modifying the shape of the first opening 105D and the second opening 105E of the first through hole 105A and the third opening 105F and the fourth opening 105G of the second through hole 105B formed at the frame support unit 105 after manufacturing the frame support unit 105. For example, the shape of the first opening 105D and the second opening 105E of the first through hole 105A and the third opening 105F and the fourth opening 105G of the second through hole 105B may be modified by modifying the mold of the frame support unit 105.

In the case of providing a simple cylindrical through hole instead of the first through hole 105A and the second through hole 105B in the frame support unit 105 and modifying the mold of the frame support unit 105 to change the position of the cylindrical through hole formed in the circumferential direction of the frame support unit 105 in order to adjust the eccentricity of the (3-1)th lens unit L31 and the (3-2)th lens unit L32, the position of the cylindrical through hole in the optical-axis direction of the frame support unit 105 and the inclination of the (3-1)th lens unit L31 and the (3-2)th lens unit L32 may also be changed. Also, in the case of modifying the mold of the frame support unit 105 to change the position of the cylindrical through hole formed in the optical-axis direction of the frame support unit 105 in order to adjust the inclination of the (3-1)th lens unit L31 and the (3-2)th lens unit L32, the position of the cylindrical through hole formed in the circumferential direction of the frame support unit 105 and the eccentricity of the (3-1)th lens unit L31 and the (3-2)th lens unit L32 may also be changed.

However, according to the first embodiment of the present invention, when the first through hole 105A and the second through hole 105B are formed in the frame support unit 105, only the inclination of the (3-1)th lens unit L31 and the (3-2)th lens unit L32 may be adjusted by modifying the mold to change only the shape of the second opening 105E and the first opening 105D formed in parallel to the circumferential direction of the frame support unit 105. Also, only the eccentricity of the (3-1)th lens unit L31 and the (3-2)th lens unit L32 may be adjusted by modifying the mold to change only the shape of the fourth opening 105G and the third opening 105F formed in parallel to the optical-axis direction.

Thus, any one of the inclination and eccentricity of the (3-1)th lens unit L31 and the (3-2)th lens unit L32 may be adjusted without affecting the other. Accordingly, the inclination and eccentricity of the (3-1)th lens unit L31 and the (3-2)th lens unit L32 may be adjusted more accurately by modifying the shape of the second through hole 105B and the first through hole 105A formed in the frame support unit 105 after manufacturing the frame support unit 105.

Also, although the descriptions of the shapes or functions of the third through hole 105C and the third insertion unit 303 are omitted herein, the third through hole 105C and the third insertion unit 303 may have the same shapes or functions as the first through hole 105A, the second through hole 105B, the first insertion unit 301, and the second insertion unit 302 described above. Accordingly, the inclination and eccentricity of the (5-1)th lens unit L51 of the fifth lens unit L5 supported by the third lens frame 108 may be adjusted by pivoting the third insertion unit 303 while inserting the third insertion unit 303 into the third through hole 105C.

Figure 11:
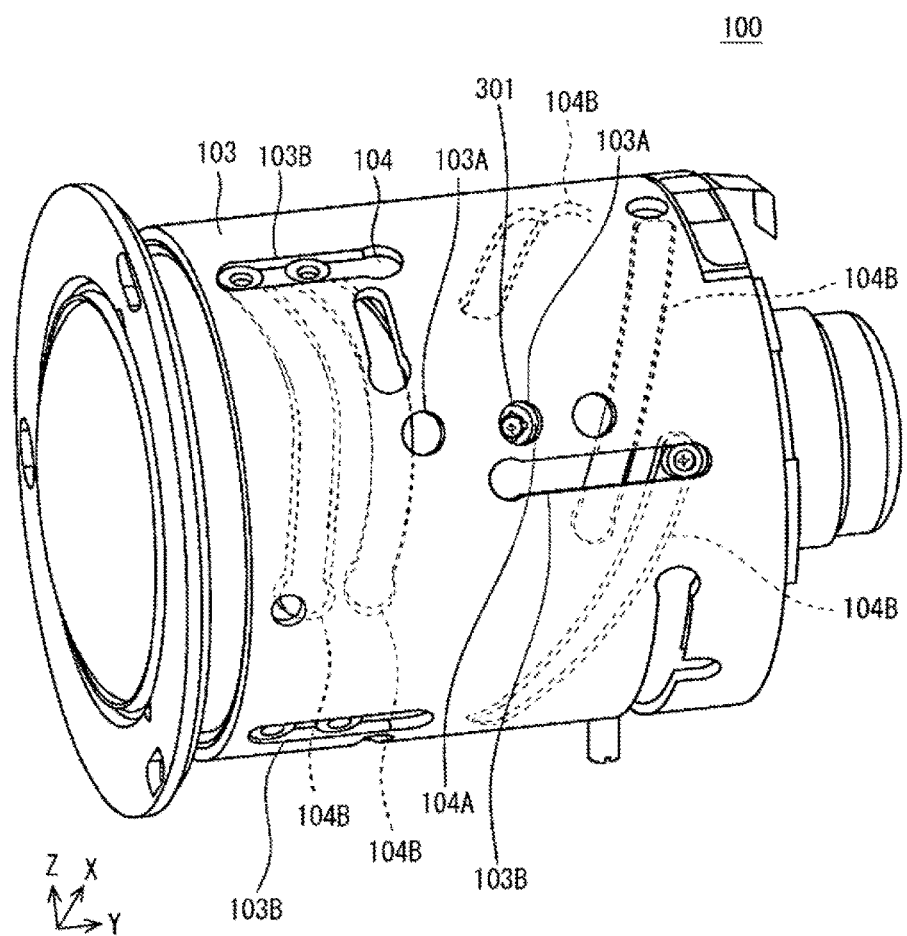
FIG. 11 is a perspective view of a lens barrel with a lens frame support unit moved to a wide end according to the first embodiment of the disclosure.
Figure 12:
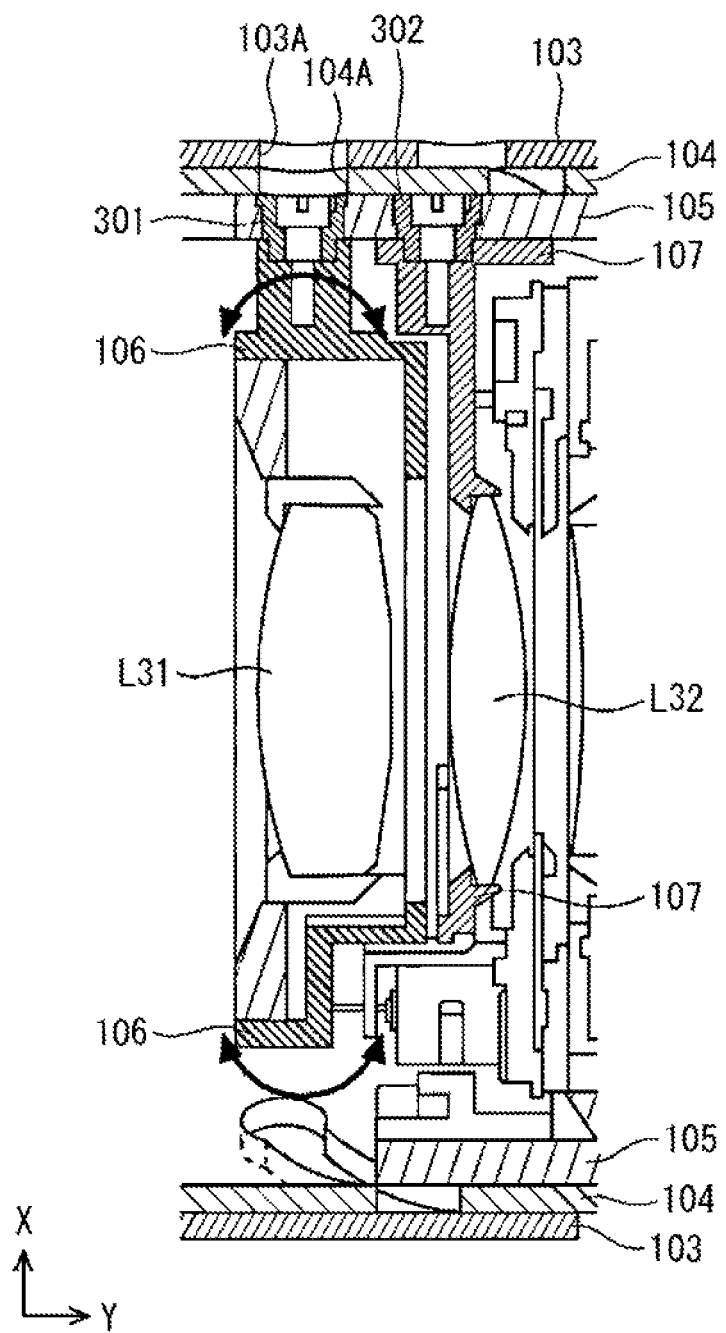
FIG. 12 is a partial cross-sectional view of a lens barrel with a lens frame support unit moved to a wide end according to the first embodiment of the disclosure.
Figure 13:
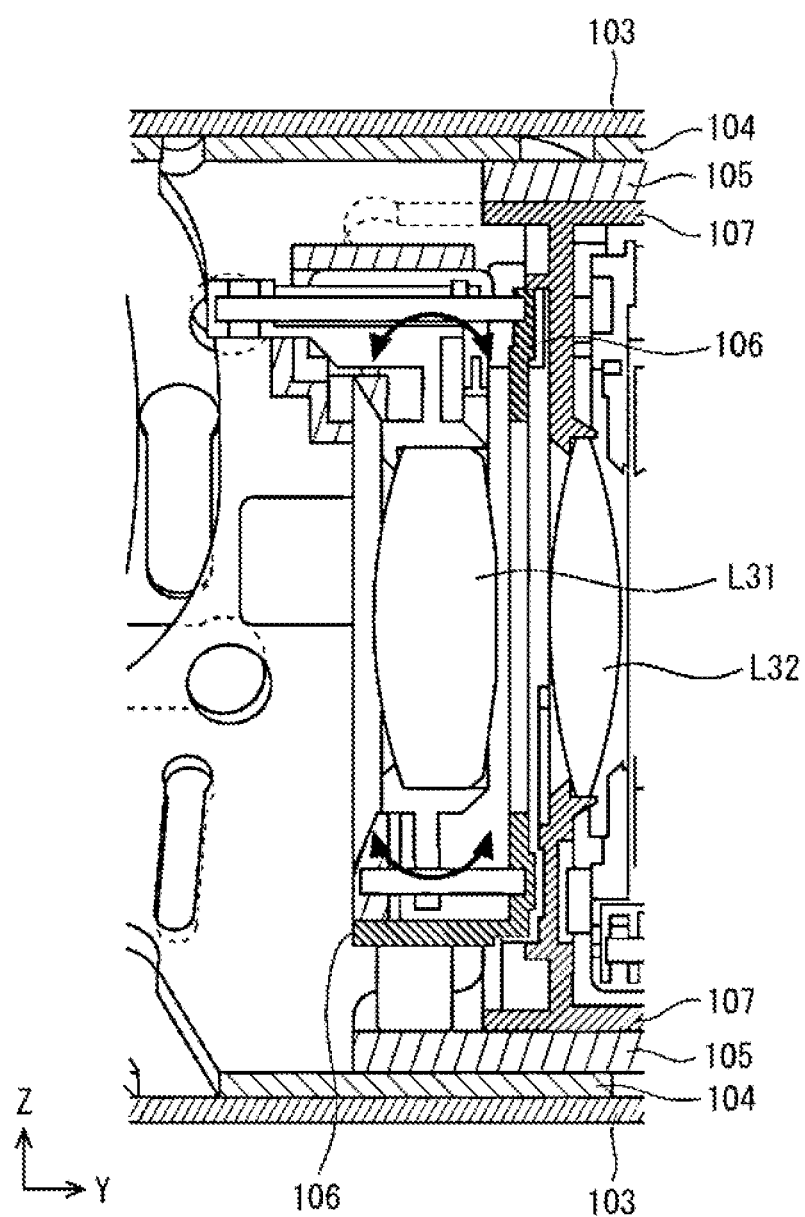
FIG. 13 is a partial cross-sectional view of a lens barrel with a lens frame support unit moved to a wide end according to the first embodiment of the disclosure.
Figure 14:
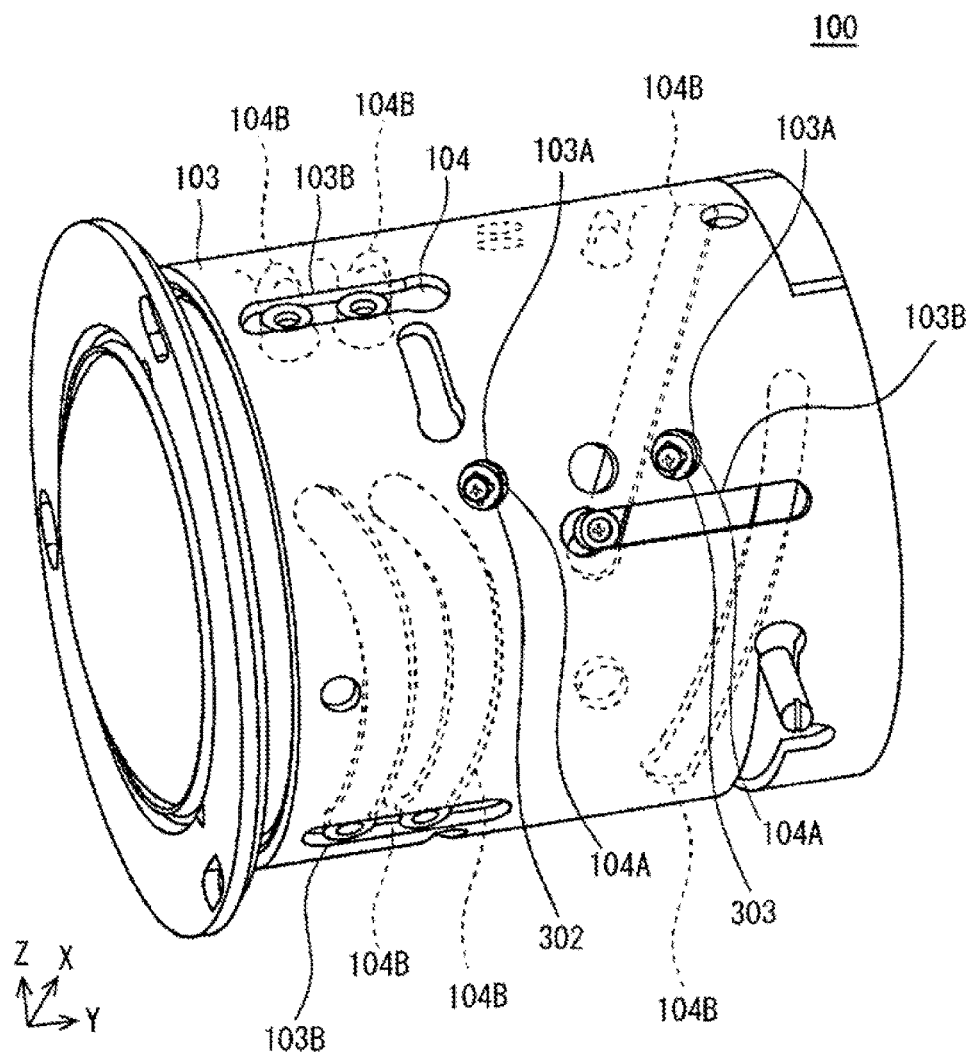
FIG. 14 is a perspective view of a lens barrel with a lens frame support unit moved to a tele end according to the first embodiment of the disclosure.
Figure 15:
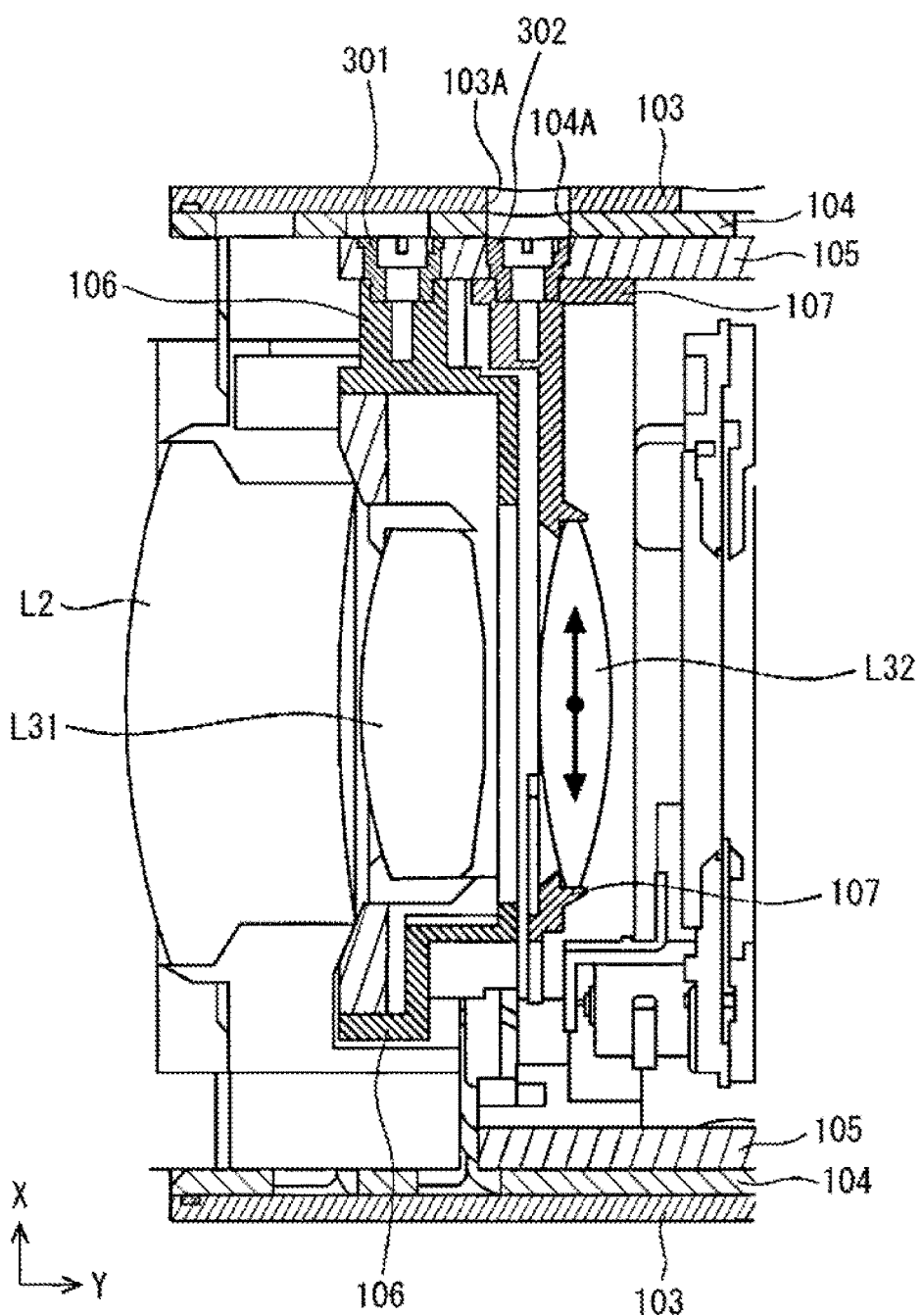
FIG. 15 is a partial cross-sectional view of a lens barrel with a lens frame support unit moved to a tele end according to the first embodiment of the disclosure.

FIG. 11 is a perspective view of the lens barrel 100 with the frame support unit 105 moved to the wide end. FIG. 12 is a cross-sectional view of the lens barrel 100 illustrated in FIG. 11. FIG. 13 is a cross-sectional view of the lens barrel 100 illustrated in FIG. 11. FIG. 14 is a perspective view of the lens barrel 100 with the frame support unit 105 moved to the tele end. FIG. 15 is a cross-sectional view of the lens barrel 100 illustrated in FIG. 14.

FIGS. 11 to 15 illustrate a state where the assembly of the lens barrel 100 is nearly completed in the process of manufacturing the imaging device 1. Herein, the state where the assembly of the lens barrel 100 is nearly completed may refer to a state where the respective lens units L1, L2, L31, L41, L42, and L52 are supported by the respective lens support units 109 to 114, the third lens support unit 111 and the lens units L32 and L51 are supported by the first to third lens frames 106 to 108, the first to third lens frames 106 to 108 are supported by the frame support unit 105, the respective lens support units 109 to 114 and the frame support unit 105 are coupled to the cam tube 104, and the cam tube 104 is coupled to the guide tube 103, in which the first to third insertion units 301 to 303 are inserted into the first to third through holes 105A to 105C and the first to third screws 401 to 403 are loosely fastened to the first to third insertion units 301 to 303 and the groove units 106A to 108A. Herein, the state where the first to third screws 401 to 403 are loosely fastened to the first to third insertion units 301 to 303 and the groove units 106A to 108A may refer to a state where the first to third screws 401 to 403 are fastened to the first to third insertion units 301 to 303 and the groove units 106A to 108A such that the first to third insertion units 301 to 303 inserted into the first to third through holes 105A to 105C may be pivoted. Also, the final optical performance of the entire lens barrel 100 may be tested by attaching the lens barrel 100 of this state to an adjustment jig (not illustrated).

Referring to FIG. 11, in the state where the assembly is nearly completed, when the cam tube 104 is pivoted such that the zoom position of the lens barrel 100 is set to the wide end, the opening unit 103A of the guide tube 103 and the opening unit 104A of the cam tube 104 may overlap each other and thus the top surface of the first insertion unit 301 may be checked from the outside of the guide tube 103.

Accordingly, a dedicated tool (not illustrated) for pivoting the first insertion unit 301 may be attached/detached from the outside of the guide tube 103. Referring to FIGS. 12 and 13, the inclination of the (3-1)th lens unit L31 may be adjusted by pivoting the first insertion unit 301 by using the dedicated tool.

According to the first embodiment of the present invention, an influence on the optical performance of the imaging device 1 caused by a manufacturing error of the (3-1)th lens unit L31 may correspond to an inclination component in the case where the zoom position is set to the wide end. In other words, the position of the frame support unit 105, at which the optical performance of the imaging device 1 mounted with the lens barrel 100 is most significantly changed by adjusting the inclination of the (3-1)th lens unit L31, may correspond to the case where the zoom position is set to the wide end. In this case, in order to adjust the inclination of the (3-1)th lens unit L31, the opening units 103A and 104A may be formed respectively in the guide tube 103 and the cam tube 104 such that the dedicated tool may be attached/detached from the outside of the guide tube 103 with respect to the first insertion unit 301.

Referring to FIG. 14, in the state where the assembly is nearly completed, when the cam tube 104 is pivoted such that the zoom position of the lens barrel 100 is set to the tele end, the opening unit 103A of the guide tube 103 and the opening unit 104A of the cam tube 104 may overlap each other and thus the top surface of the second insertion unit 302 and the third insertion unit 303 may be checked from the outside of the guide tube 103. Accordingly, a dedicated tool (not illustrated) for pivoting the second insertion unit 302 and the third insertion unit 303 may be attached/detached from the outside of the guide tube 103. Referring to FIG. 15, the inclination of the (3-2)th lens unit L32 may be adjusted by pivoting the second insertion unit 302 by using the dedicated tool. In addition, although not illustrated, the eccentricity and inclination of the (5-1)th lens unit L51 may be adjusted by pivoting the third insertion unit 303 by using the dedicated tool.

According to the first embodiment of the present invention, an influence on the optical performance of the imaging device 1 caused by a manufacturing error of the (3-2)th lens unit L32 may correspond to an eccentricity component in the case where the zoom position is set to the tele end. In other words, the position of the frame support unit 105, at which the optical performance of the imaging device 1 mounted with the lens barrel 100 is most significantly changed by adjusting the eccentricity of the (3-2)th lens unit L32, may correspond to the case where the zoom position is set to the tele end. In this case, in order to adjust the eccentricity of the (3-2)th lens unit L32, the opening units 103A and 104A for attaching/detaching the dedicated tool from the outside of the guide tube 103 with respect to the second insertion unit 302 may be formed respectively in the guide tube 103 and the cam tube 104.

As described above, by the lens barrel 100 according to the first embodiment of the present invention, by inserting the first cylinder unit 301A arranged eccentrically with respect to the pivot axis of the first insertion unit 301 into the first opening 105D formed in parallel to the circumferential direction of the frame support unit 105 among a plurality of first openings 105D and second openings 105E constituting the first through hole 105A and pivoting the first insertion unit 301, the inclination of the (3-1)th lens unit L31 may be adjusted and the first lens frame 106 supporting the (3-1)th lens unit L31 may be coupled to the frame support unit 105.

Also, by inserting the second cylinder unit 301B arranged eccentrically with respect to the pivot axis of the first insertion unit 301 into the second opening 105E formed in parallel to the optical axis and pivoting the first insertion unit 301, the eccentricity of the (3-1)th lens unit L31 may be adjusted and the first lens frame 106 supporting the (3-1)th lens unit L31 may be coupled to the frame support unit 105.

By inserting the second cylinder unit 302B arranged eccentrically with respect to the pivot axis of the second insertion unit 302 into the fourth opening 105G formed in parallel to the optical axis of the lens barrel 100 among a plurality of third openings 105F and fourth openings 105G constituting the second through hole 105B and pivoting the second insertion unit 302, the eccentricity of the (3-2)th lens unit L32 may be adjusted and the second lens frame 107 supporting the (3-2)th lens unit L32 may be coupled to the frame support unit 105.

Also, by eccentricating the first cylinder unit 302A with respect to the pivot axis of the second insertion unit 302, inserting the eccentricated first cylinder unit 302A into the third opening 105F of the second through hole 105B, and pivoting the second insertion unit 302, the inclination of the (3-2)th lens unit L32 may be adjusted and the second lens frame 107 supporting the (3-2)th lens unit L32 may be coupled to the frame support unit 105.

In other words, with respect to the first lens frame 106 and the second lens frame 107 supporting the (3-1)th lens unit L31 and the (3-2)th lens unit L32, at each of three or more positions in the circumferential direction of the frame support unit 105, without providing the opening for adjusting the eccentricity of the (3-1)th lens unit L31 and the (3-2)th lens unit L32 and the opening for adjusting the inclination of the (3-1)th lens unit L31 and the (3-2)th lens unit L32 adjacently in the optical-axis direction of the frame support unit 105, just by providing the first through hole 105A and the second through hole 105B at each of three or more positions in the circumferential direction of the frame support unit 105, the inclination and eccentricity of the (3-1)th lens unit L31 and the (3-2)th lens unit L32 may be adjusted and the first lens frame 106 and the second lens frame 107 may be coupled to the frame support unit 105.

That is, in comparison with the case of disposing two openings adjacently in the optical-axis direction of the frame support unit 105, it may be possible to adjust the inclination and eccentricity of the (3-1)th lens unit L31 and the (3-2)th lens unit L32 while reducing the number of openings installed in the frame support unit 105. Thus, it may be possible to prevent the increase of the size of the lens barrel 100, the degradation of the basic optical performance, and the constraint on the design of a lens optical system according to the disposition of two openings adjacently in the optical-axis direction of the frame support unit 105. Thus, it may be possible to provide the lens barrel 100 that may adjust the inclination and eccentricity of the (3-1)th lens unit L31 and the (3-2)th lens unit L32 without increasing the size of the lens barrel 100 while maintaining the design freedom of a lens optical system.

Also, the third opening 105F and the first opening 105D located at the outer peripheral side of the frame support unit 105 may have a larger opening width than the fourth opening 105G and the second opening 105E located at the inner peripheral side of the frame support unit 105. Accordingly, the first through hole 105A and the second through hole 105B may be processed and formed from the outside of the frame support unit 105. Also, the frame support unit 105 including the first through hole 105A and the second through hole 105B may be molded by injection molding of outer slide core method.

Also, the opening units 103A and 104A for attaching/detaching a dedicated tool for pivoting the first to third insertion units 301, 302, and 303 from the outside of the guide tube 103 and the cam tube 104 with respect to the first to third insertion units 301, 302, and 303 inserted into the first to third through holes 105A, 105B, and 105C of the frame support unit 105 may be formed respectively in the guide tube 103 and the cam tube 104.

Accordingly, the inclination and eccentricity of the third lens unit L3 and the (5-1)th lens unit L51 may be adjusted in the state where the assembly of the lens barrel 100 is nearly completed.

Also, the case where the frame support unit is arranged at the position, at which the optical performance of the imaging device 1 mounted with the lens barrel 100 is most significantly changed by adjusting the inclination of the (3-1)th lens unit L31, may correspond to the case where the zoom position is set to the wide end. In this case, the opening units 103A and 104A for attaching/detaching a dedicated tool (not illustrated) from the outside of the guide tube 103 and the cam tube 104 with respect to the first insertion unit 301 for adjusting the inclination of the (3-1)th lens unit L31 may be formed respectively in the guide tube 103 and the cam tube 104.

Also, the case where the frame support unit is arranged at the position, at which the optical performance of the imaging device 1 mounted with the lens barrel 100 is most significantly changed by adjusting the eccentricity of the (3-2)th lens unit L32, may correspond to the case where the zoom position is set to the tele end. In this case, the opening units 103A and 104A for attaching/detaching a dedicated tool (not illustrated) from the outside of the guide tube 103 and the cam tube 104 with respect to the second insertion unit 302 for adjusting the eccentricity of the (3-2)th lens unit L32 may be formed respectively in the guide tube 103 and the cam tube 104.

Accordingly, it may be possible to adjust an adjustment component affecting the optical performance of the imaging device 1 most significantly among the inclination and eccentricity of the third lens unit L3 in the state where the assembly of the lens barrel 100 is nearly completed.

<Second Embodiment of Present Invention>

The first embodiment of the present invention has illustrated a support structure capable of adjusting the inclination or eccentricity of the third lens unit L3 and the (5-1)th lens unit L51. The support structure may also be applied to an imaging element frame support member supporting an imaging element. Hereinafter, an imaging element support structure 210 according to a second embodiment of the present invention will be described.

Figure 16:
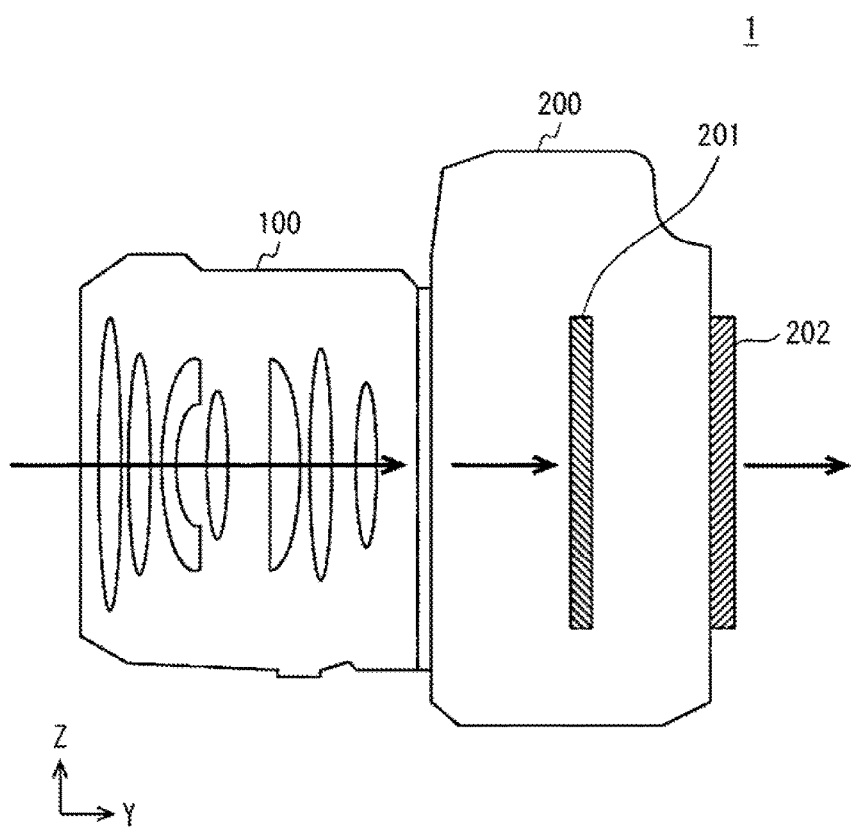
FIG. 16 is a cross-sectional view of an imaging device according to a second embodiment of the disclosure.

FIG. 16 is a cross-sectional view illustrating an internal structure of an imaging device 1 according to a second embodiment of the present invention. In the second embodiment of the present invention, a horizontal direction of the imaging device 1 corresponds to an X axis, an optical-axis direction of the imaging device 1 corresponds to a Y axis, and a vertical direction of the imaging device 1 corresponds to a Z axis.

Referring to FIG. 16, the imaging device 1 may include a lens barrel 100 and a main body unit 200. Also, the main body unit 200 of the imaging device 1 may include, for example, an image sensor 201 as an imaging element and a liquid crystal display (LCD) screen 202 as a display unit. Also, as illustrated by an arrow in FIG. 16, an image formed by a lens unit arranged at the lens barrel 100 may be detected by the image sensor 201 and then displayed on the LCD screen 202. The imaging sensor 201 may be, for example, a charge-coupled device (CCD) or a complementary metal-oxide semiconductor (CMOS).

Figure 17:
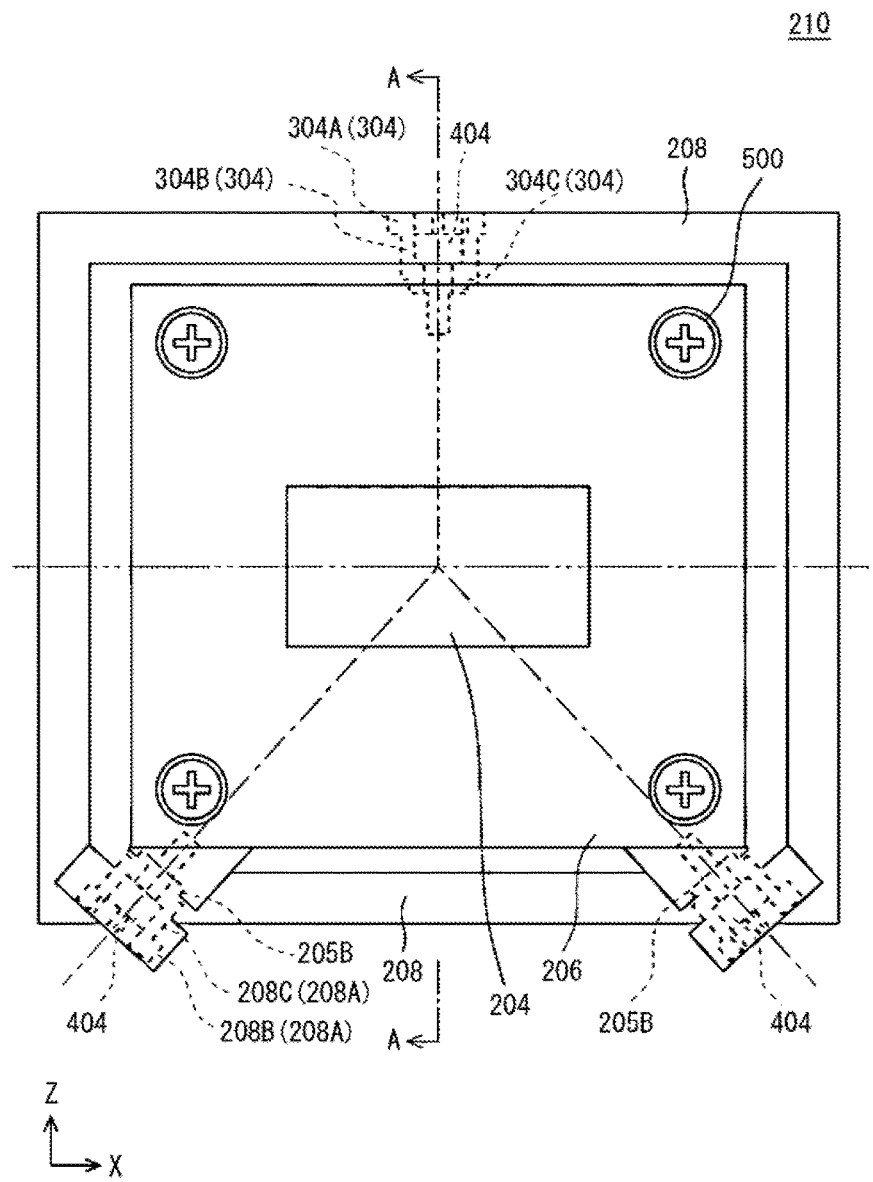
FIG. 17 is a rear view of a portion of an imaging element support structure according to the second embodiment of the disclosure.
Figure 18:
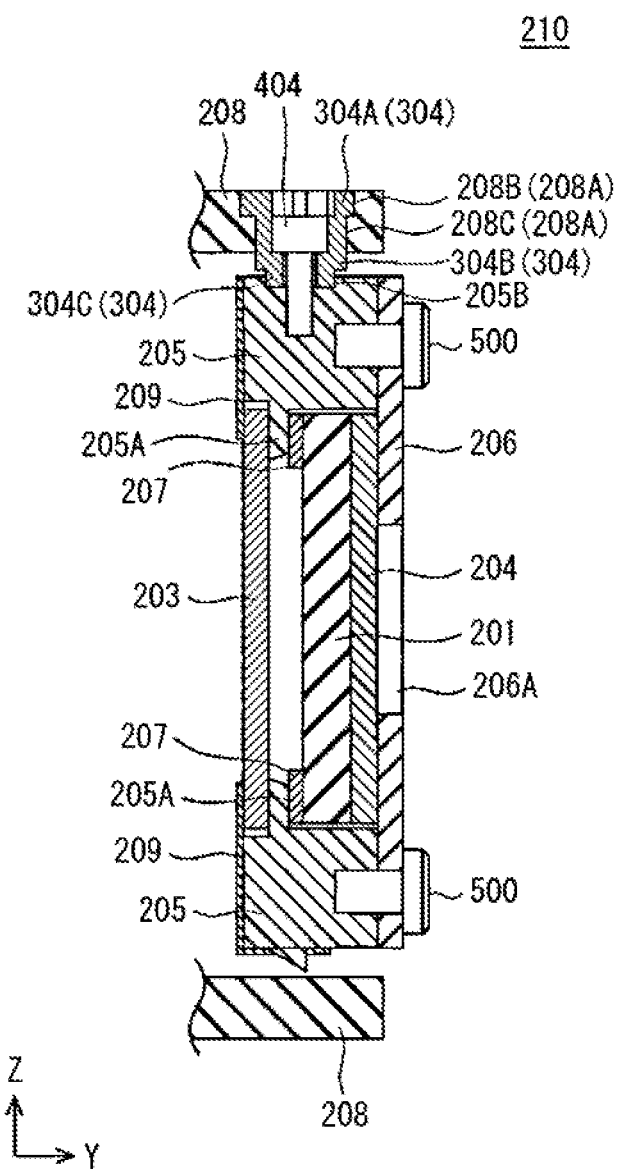
FIG. 18 is a cross-sectional view of a portion of an imaging element support structure taken along a line A-A in FIG. 17.

FIGS. 17 and 18 illustrate an imaging element support structure 210 according to a second embodiment of the present invention. In the imaging element support structure 210, an imaging element frame support frame 208 may support an imaging element frame 205 supporting the image sensor 201. FIG. 18 is a cross-sectional view taken along a line A-A in FIG. 17. Also, a dot-dash line in FIG. 17 represents a pivot axis of a fourth insertion unit 304 (see FIG. 18).

Referring to FIGS. 16 to 18, the main body unit 200 may include, for example, an image sensor 201, an LCD screen 202, a low-pass filter 203, a substrate 204, an imaging element frame 205, a plate member 206, a buffer member 207, and an imaging element frame support member 208. In the second embodiment of the present invention, the imaging element frame 205 and the imaging element frame support member 208 may be formed in a substantially rectangular shape. The imaging element frame 205 may be formed to be accommodated in the imaging element frame support member 208.

As illustrated in FIG. 18, the low-pass filter 203, the image sensor 201, and the substrate 204 may be arranged in the imaging element frame 205 from the lens barrel 100 side to the LCD screen 202 side. In this case, the imaging element frame 205 may include a protrusion unit 205A between the low-pass filter 203 and the image sensor 201, and the protrusion unit 205A may contact the image sensor 201 with the buffer member 207 therebetween. Also, the low-pass filter 203 may be fixed by a fixing member 209 to the protrusion unit 205A to contact the protrusion unit 205A, thus preventing the intrusion of dust or the like between the image sensor 201 and the low-pass filter 203.

The substrate 204 may contact the lens barrel 100 side of the image sensor 201. Also, the imaging element frame 205 capable of supporting the low-pass filter 203, the image sensor 201, and the substrate 204 may be fixed to the plate member 206 by a fifth screw 500.

The plate member 206 may be, for example, a metal plate such as an aluminum plate and may include a rectangular opening unit 206A at a center portion thereof The imaging element frame 205 may be supported by the imaging element frame support member 208.

In the imaging element frame support member 208, a fourth through hole 208A may be formed at three or more positions in the circumferential direction of the imaging element frame support member 208 to penetrate the imaging element frame support member 208. As an example, three fourth through holes 208A may be formed at a center portion of an upper side and both end portions of a lower side in the imaging element frame support member 208.

Also, in the imaging element frame 205, a fourth groove unit 205B may be formed at three or more positions in the circumferential direction of the imaging element frame 205. Also, the fourth groove unit 205B formed in the imaging element frame 205 may be formed at a position corresponding to the position of the fourth through hole 208A formed in the imaging element frame support member 208.

According to the second embodiment of the present invention, three fourth groove units 205B may be formed at a center portion of an upper side and both end portions of a lower side in the imaging element frame 205. In addition, the position of the fourth through hole 208A in the imaging element frame support member 208 and the position of the fourth groove unit 205B in the imaging element frame 205 are not limited to the present second embodiment.

The imaging element frame 205 may be supported inside the imaging element frame support member 208 by fixing a fourth insertion unit 304, which is inserted into the fourth through hole 208A of the imaging element frame support member 208 and the fourth groove unit 205B of the imaging element frame 205, by a fourth screw 404.

Accordingly, the image sensor 201 may be indirectly supported by the imaging element frame support member 208.

The fourth through hole 208A may be formed in the same shape as the first to third through holes 105A, 105B, and 105C according to the first embodiment of the present invention. That is, the fourth through hole 208A may be formed by connecting a plurality of openings having different opening widths in the thicknesswise direction of the imaging element frame support member 208. Also, at least one fifth opening 208B among the plurality of openings constituting the fourth through hole 208A may be formed in parallel to the circumferential direction of the imaging element frame support member 208, and at least one sixth opening 208C may be formed in parallel to the optical axis of the optical system of the imaging device 1. In detail, the fifth opening 208B located at the outer wall side of the imaging element frame support member 208 may be formed in the circumferential direction of the imaging element frame support member 208, and the sixth opening 208C located at the inner wall side of the imaging element frame support member 208 may be formed in parallel to the optical axis of the imaging element support structure 210.

The fifth opening 208B located at the outer wall side of the imaging element frame support member 208 may have a larger opening width than the sixth opening 208C located at the inner wall side of the imaging element frame support member 208. In other words, the fifth opening 208B located at the outer wall side may have a smaller opening area than the sixth opening 208C located at the inner wall side.

The fourth insertion unit 304 inserted into the fourth through hole 208A may be formed in the same shape as the first to third insertion units 301, 302, and 303 according to the first embodiment of the present invention. That is, at least two fourth insertion units 304 among three or more fourth insertion units 304 inserted respectively into the fourth through holes 208A formed at three or more positions in the circumferential direction of the imaging element frame support member 208 may include a first cylinder unit 304A (an eccentric cylinder unit) and a second cylinder unit 304B (a concentric cylinder unit). The first cylinder unit 304A may be formed eccentrically with respect to the pivot axis (represented by the dot-dash line in FIG. 17) of the fourth insertion unit 304, and the second cylinder unit 304B may be formed concentrically with respect to the pivot axis of the fourth insertion unit 304.

As an example, three fourth insertion units 304 may include a first cylinder unit 304A, a second cylinder unit 304B, and a third cylinder unit 304C. The first cylinder unit 304A, the second cylinder unit 304B, and the third cylinder unit 304C may be sequentially arranged in the direction of the fourth insertion unit 304 being inserted into the fourth through hole 208A. In other words, when the fourth insertion unit 304 is inserted into the fourth through hole 208A, the outer wall of the first cylinder unit 304A may contact the inner wall of the fifth opening 208B of the fourth through hole 208A. Also, when the fourth insertion unit 304 is inserted into the fourth through hole 208A, the outer wall of the second cylinder unit 304B may contact the inner wall of the sixth opening 208C of the fourth through hole 208A. Also, when the fourth insertion unit 304 is inserted into the fourth through hole 208A, the outer wall of the third cylinder unit 304C may contact the inner wall of the fourth groove unit 205B of the imaging element frame 205.

When the fourth insertion unit 304 is inserted into the fourth through hole 208A, the outer wall of the first cylinder unit 304A arranged eccentrically with respect to the pivot axis of the fourth insertion unit 304 may contact the inner wall of the fifth opening 208B formed in parallel to the circumferential direction of the imaging element frame support member 208. Thus, when the coupling between the fourth through hole 208A and the fourth insertion unit 304 by the fourth screw 404 is loosened, the imaging element frame 205 may be inclined in the optical-axis direction of the imaging device 1 by pivoting the fourth insertion unit 304 by using a dedicated tool (not illustrated). The inclination of the imaging element frame 205 with respect to the optical-axis direction of the imaging device 1 may be adjusted by pivoting the fourth insertion units 304 inserted respectively into three fourth through holes 208A formed equidistantly in the circumferential direction of the imaging element frame support member 208. In other words, the inclination of the image sensor 201 may be adjusted by pivoting the fourth insertion unit 304 inserted into each of the three fourth through holes 208A provided in the circumferential direction of the imaging element frame support member 208.

The first cylinder unit 304A arranged eccentrically with respect to the pivot axis of the fourth insertion unit 304 may have a smaller height than the second cylinder unit 304B arranged concentrically with respect to the pivot axis of the fourth insertion unit 304. Accordingly, when the fourth insertion unit 304 inserted into the fourth through hole 208A is pivoted, a stress that may be generated between the fifth opening 208B of the fourth through hole 208A and the first cylinder unit 304A arranged eccentrically with respect to the pivot axis may be suppressed to a minimum.

Also, in order to correspond to the height of the first cylinder unit 304A and the height of the second cylinder unit 304B, the depth of the fifth opening 208B of the fourth through hole 208A may be formed to be smaller than the depth of the sixth opening 208C. Accordingly, when the fourth insertion unit 304 inserted into the fourth through hole 208A is pivoted, a stress that may be generated between the fifth opening 208B and the first cylinder unit 304A may be more surely suppressed to a minimum.

However, the present invention is not limited thereto, and the depth of the fifth opening 208B of the fourth through hole 208A may be formed to be equal to the depth of the sixth opening 208C. When the depth of the fifth opening 208B is equal to the depth of the sixth opening 208C, the eccentricity of the imaging element frame 205 may be adjusted by pivoting an insertion unit, in which the outer wall of the cylinder unit arranged eccentrically with respect to the pivot axis contacts the inner wall of the sixth opening 208C formed in parallel to the optical axis, while inserting the insertion unit into the fourth through hole 208A. Thus, both the eccentricity and inclination of the imaging element frame 205 may be adjusted by providing three or more fourth through holes 208A at certain positions in the circumferential direction of the imaging element frame support member 208. In other words, both the eccentricity and inclination of the image sensor 201 may be adjusted by pivoting an insertion unit including at least one cylinder unit arranged eccentrically with respect to the pivot axis while inserting the insertion unit into the three or more fourth through holes 208A provided at certain positions in the circumferential direction of the imaging element frame support member 208.

The first cylinder unit 304A may be arranged concentrically with respect to the pivot axis of the fourth insertion unit 304. In other words, the first cylinder unit 304A, the second cylinder unit 304B, and the third cylinder unit 304C may be arranged concentrically with respect to the pivot axis of the fourth insertion unit 304. In this case, the eccentricity and inclination of the image sensor 201 may not be adjusted even by pivoting the fourth insertion unit 304 while inserting the fourth insertion unit 304 into the fourth through hole 208A.

However, the eccentricity and the inclination of the image sensor 201 may be adjusted by modifying the shape of the fifth opening 208B and the sixth opening 208C of the fourth through hole 208A formed in the imaging element frame support member 208 after manufacturing the imaging element frame support member 208. For example, the shape of the fifth opening 208B and the sixth opening 208C included in the fourth through hole 208A may be modified by modifying the mold of the imaging element frame support member 208.

In the case of providing a simple cylindrical through hole instead of the fourth through hole 208A in the imaging element frame support member 208 and modifying the mold of the imaging element frame support member 208 to change only the position of the cylindrical through hole formed in the circumferential direction of the imaging element frame support member 208 in order to adjust the eccentricity of the image sensor 201, the position of the cylindrical through hole in the optical-axis direction of the imaging element frame support member 208 and the inclination of the image sensor 201 may also be changed. Also, in the case of modifying the mold of the imaging element frame support member 208 to change the position of the cylindrical through hole formed along the imaging element frame support member 208 in order to adjust the inclination of the image sensor 201, the position of the cylindrical through hole formed in the circumferential direction of the imaging element frame support member 208 and the eccentricity of the image sensor 201 may also be changed.

However, according to the second embodiment of the present invention, when the fourth through hole 208A is formed in the imaging element frame support member 208, only the inclination of the image sensor 201 may be adjusted by changing only the shape of the fifth opening 208B formed in parallel to the circumferential direction of the imaging element frame support member 208. Also, only the eccentricity of the image sensor 201 may be adjusted by changing only the shape of the sixth opening 208C formed in parallel to the optical-axis direction.

That is, one of the inclination and eccentricity of the image sensor 201 may be adjusted without affecting the other. Accordingly, the inclination and eccentricity of the image sensor 201 may be adjusted more accurately by modifying the shape of the fourth through hole 208A formed in the imaging element frame support member 208 after manufacturing the imaging element frame support member 208.

The inclination of the image sensor 201 may be adjusted by pivoting the fourth insertion unit 304 by using a dedicated tool (not illustrated) in a state where the assembly of the imaging element frame support member 208 is nearly completed. Herein, the state where the assembly of the imaging element frame support member 208 is nearly completed may refer to a state where the low-pass filter 203, the image sensor 201, and the substrate 204 are coupled to the imaging element frame 205, the imaging element frame 205 is fixed to the plate member 206 by using the fifth screw 500, and the imaging element frame 205 is coupled to the imaging element frame support member 208, in which the fourth insertion unit 304 is inserted into the fourth through hole 208A and the fourth insertion unit 304 and the fourth groove unit 205B are loosely fastened by using the fourth screw unit 404. Herein, the state where the fourth screw 404 is loosely fastened to the fourth insertion unit 304 and the fourth groove unit 205B may refer to a state where the fourth screw 404 is fastened to the fourth insertion unit 304 and the fourth groove unit 205B such that the fourth insertion unit 304 inserted into the fourth through hole 208A may be pivoted.

As described above, by the imaging element frame support member 208 according to the second embodiment of the present invention, by inserting the first cylinder unit 304A formed eccentrically with respect to the pivot axis of the fourth insertion unit 304 into the fifth opening 208B formed in parallel to the circumferential direction of the imaging element frame support member 208 among a plurality of fifth openings 208B and sixth openings 208C constituting the fourth through hole 208A and pivoting the fourth insertion unit 304, the inclination of the image sensor 201 may be adjusted and the imaging element frame 205 supporting the image sensor 201 may be coupled to the imaging element frame support member 208.

In addition, by disposing the second cylinder unit 304B eccentrically with respect to the pivot axis of the fourth insertion unit 304, inserting the second cylinder unit 304B into the sixth opening 208C formed in parallel to the optical axis, and pivoting the fourth insertion unit 304, the eccentricity of the image sensor 201 may be adjusted and the imaging element frame 205 supporting the image sensor 201 may be coupled to the imaging element frame support member 208.

In other words, with respect to the imaging element frame 205 capable of supporting the image sensor 201, at each of three or more positions in the circumferential direction of the imaging element frame support member 208, without providing the opening for adjusting the eccentricity of the image sensor 201 and the opening for adjusting the inclination of the image sensor 201 adjacently in the optical-axis direction of the imaging element frame support member 208, just by providing one fourth through hole 208A at each of three or more positions in the circumferential direction of the imaging element frame support member 208, the inclination and eccentricity of the image sensor 201 may be adjusted and the imaging element frame 205 may be attached to the imaging element frame support member 208.

That is, in comparison with the case of disposing two openings adjacently in the optical-axis direction of the imaging element frame support member 208, it may be possible to adjust the inclination and eccentricity of the image sensor 201 while reducing the number of openings provided in the imaging element frame support member 208. Thus, it may be possible to prevent the increase of the size of the main body unit 200 and the constraint on the design of the main body unit 200 according to the disposition of two openings adjacently in the optical-axis direction of the imaging element frame support member 208. Thus, it may be possible to provide the imaging element support structure 210 that may adjust the inclination and eccentricity of the image sensor 201 without increasing the size of the main body unit 200 while maintaining the design freedom of the main body unit 200.

Also, the fifth opening 208B located at the outer peripheral side of the imaging element frame support member 208 may have a larger opening width than the sixth opening 208C located at the inner peripheral side of the imaging element frame support member 208. Accordingly, the fourth through hole 208A may be processed and formed from the outside of the imaging element frame support member 208. Also, the imaging element frame support member 208 including the fourth through hole 208A may be molded by injection molding of outer slide core method.

<Third Embodiment of Present Invention>

The support structure capable of adjusting the inclination and eccentricity of the lens unit according to the first embodiment of the present invention may also be applied to a display element frame support member capable of supporting a display element in an electronic viewfinder. Hereinafter, an electronic viewfinder 600 according to a third embodiment of the present invention will be described.

Figure 19:
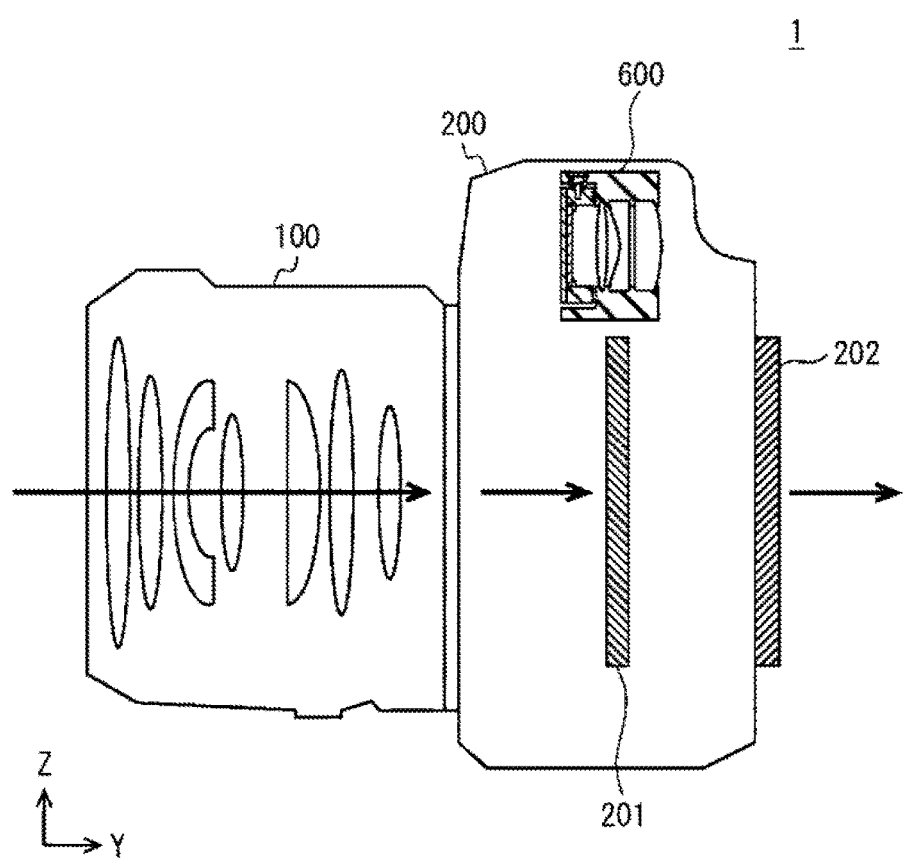
FIG. 19 is a cross-sectional view of an imaging device according to a third embodiment of the disclosure.

FIG. 19 is a cross-sectional view illustrating an internal structure of an imaging device 1 according to a third embodiment of the present invention. In the present embodiment, a horizontal direction of the imaging device 1 corresponds to an X axis, an optical-axis direction of the imaging device 1 corresponds to a Y axis, and a vertical direction of the imaging device 1 corresponds to a Z axis. Referring to FIG. 19, the imaging device 1 may include a lens barrel 100, a main body unit 200, and an electronic viewfinder 600. Also, the main body unit 200 of the imaging device 1 may include, for example, an image sensor 201 as an imaging element and a LCD screen 202 as a display unit. As illustrated by an arrow in FIG. 19, an image formed by a lens unit arranged at the lens barrel 100 may be detected by the image sensor 201 and then displayed on the LCD screen 202. The imaging sensor 201 may be, for example, a charge-coupled device (CCD) or a complementary metal-oxide semiconductor (CMOS). Also, data about the image detected and generated by the image sensor 201 may be input to the electronic viewfinder 600.

Figure 20:
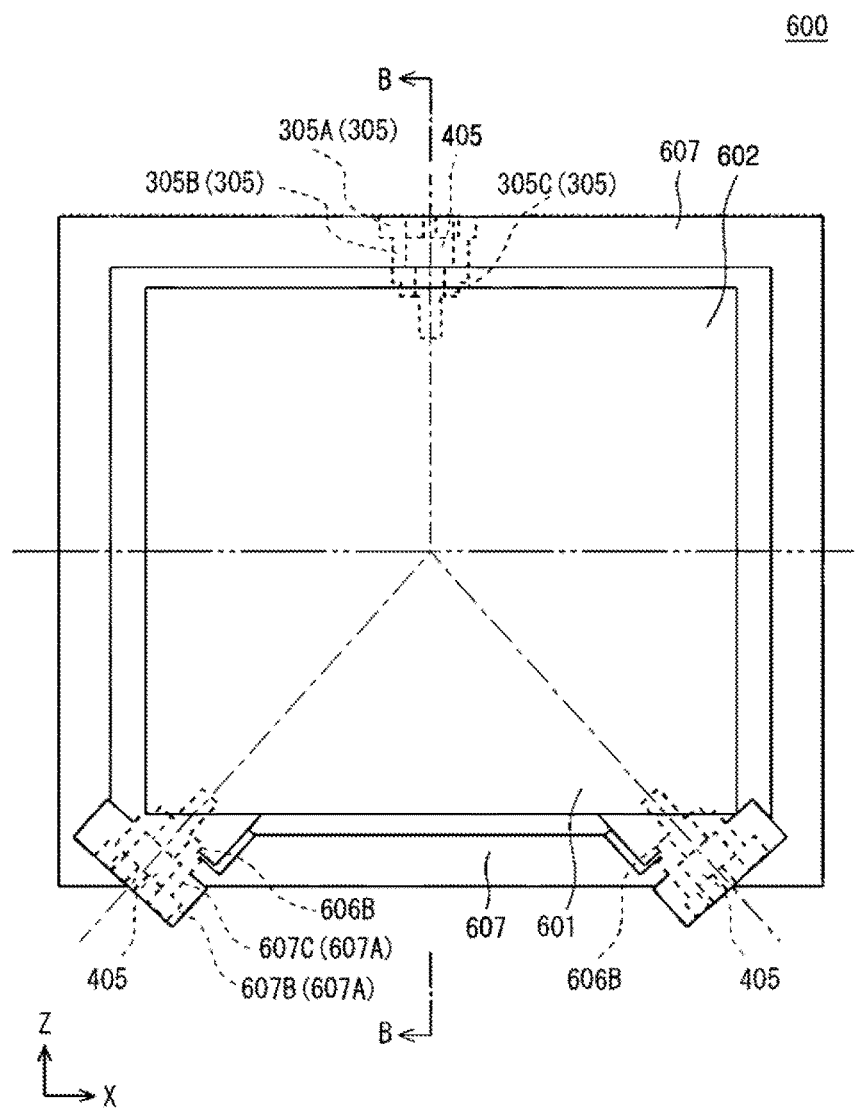
FIG. 20 is a rear view of an electronic viewfinder according to the third embodiment of the disclosure.
Figure 21:
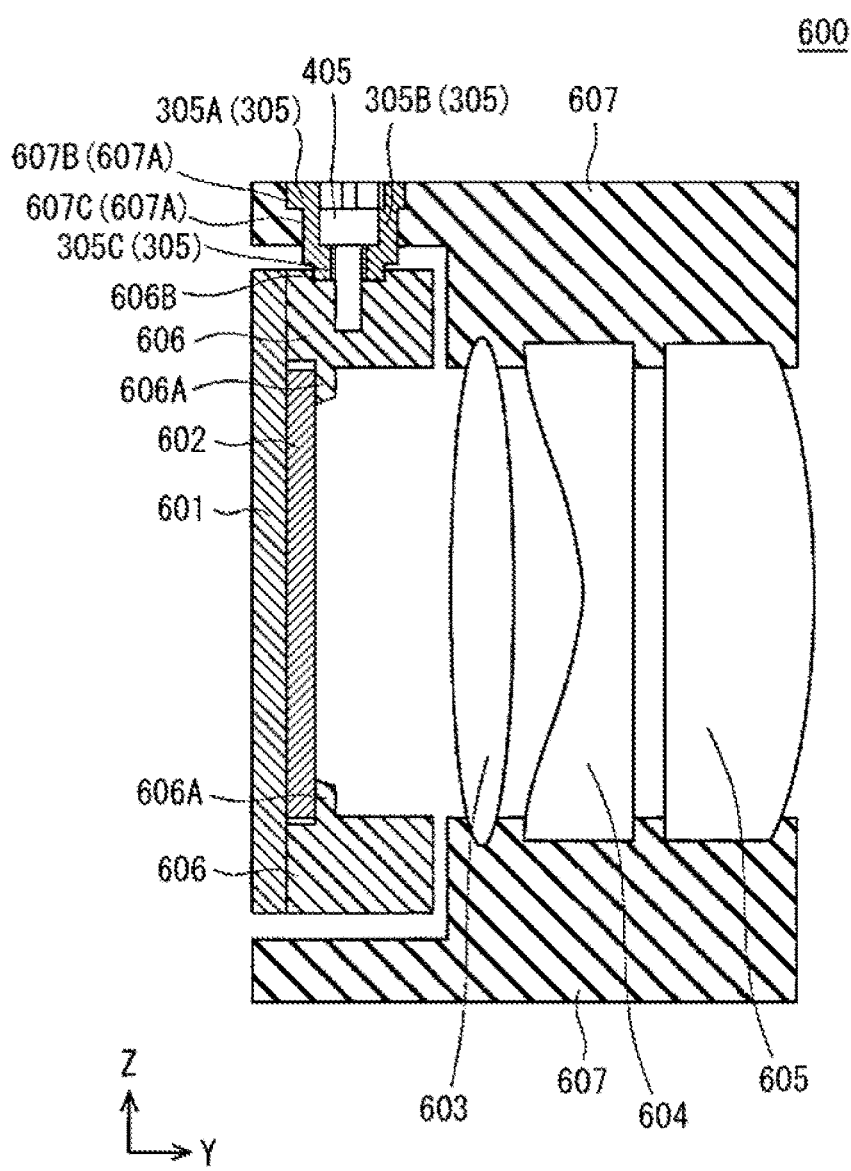
FIG. 21 is a cross-sectional view of a portion of an electronic viewfinder taken along a line B-B in FIG. 20.

FIGS. 20 and 21 illustrate a support structure for a display element 602 of an electronic viewfinder 600 according to a third embodiment of the present invention. FIG. 21 is a cross-sectional view taken along a line B-B in FIG. 20. Also, a dot-dash line in FIG. 20 represents a pivot axis of a fifth insertion unit 305. Referring to FIGS. 19 to 21, the electronic viewfinder 600 may include a substrate 601, a display element 602, lens units 603 to 605, a display element frame 606, and a display element frame support member 607. According to the third embodiment of the present invention, the display element frame 606 and the display element frame support member 607 may be formed in a rectangular shape. The display element frame 606 may be accommodated in the display element frame support member 607. As illustrated in FIG. 21, the substrate 601 and the display element 602 may be arranged in the display element frame 606 from the lens barrel 100 side to the LCD screen 202 side. Also, the display element frame 606 may include a protrusion unit 606A on the LCD screen 202 side of the display element 602, and the display element 602 may be inserted between the protrusion unit 606A and the substrate 601. Also, the display element frame 606 and the lens units 603 to 605 may be arranged in the display element frame support member 607 from the lens barrel 100 side to the LCD screen 202 side.

In the display element frame support member 607, a fifth through hole 607A may be formed at three or more positions in the circumferential direction of the display element frame support member 607 to penetrate the display element frame support member 607. As an example, three fifth through holes 607A may be formed at a center portion of an upper side and both end portions of a lower side in the display element frame support member 607.

Also, in the display element frame 606, a fifth groove unit 606B may be formed at three or more positions in the circumferential direction of the display element frame 606. The fifth groove unit 606B formed in the display element frame 606 may be formed at a position corresponding to the position of the fifth through hole 607A formed in the display element frame support member 607. As an example, in the display element frame 606, three fifth groove units 606B may be formed at a center portion of an upper side and both end portions of a lower side in the display element frame 606. However, the position of the fifth through hole 607A in the display element frame support member 607 and the position of the fifth groove unit 606B in the display element frame 606 are not limited to the third embodiment of the present invention.

The display element frame 606 may be coupled inside the display element frame support member 607 by fixing the fifth insertion unit 305, which is inserted into the fifth through hole 607A of the display element frame support member 607 and the fifth groove unit 606B of the display element frame 606, by using a fifth screw 405.

Accordingly, the display element 602 may be indirectly supported by the display element frame support member 607.

The fifth through hole 607A may be formed in the same shape as the fourth through hole 208A according to the second embodiment of the present invention. That is, the fifth through hole 607A may be formed by disposing a plurality of openings having different opening widths in the thicknesswise direction of the display element frame support member 607. Also, at least one seventh opening 607B among the plurality of openings constituting the fifth through hole 607A may be formed in parallel to the circumferential direction of the display element frame support member 607, and at least one eighth opening 607C may be formed in parallel to the optical axis of the electronic viewfinder 600. In detail, the seventh opening 607B located at the outer peripheral side of the display element frame support member 607 may be formed in the circumferential direction of the display element frame support member 607, and the eighth opening 607C located at the inner peripheral side of the display element frame support member 607 may be formed in parallel to the optical axis of the electronic viewfinder 600.

Also, the seventh opening 607B located at the outer peripheral side of the display element frame support member 607 may have a larger opening width than the eighth opening 607C located at the inner peripheral side of the display element frame support member 607. In other words, the seventh opening 607B located at the outer peripheral side may have a smaller opening area than the eighth opening 607C located at the inner peripheral side.

The fifth insertion unit 305 inserted into the fifth through hole 607A may be formed in the same shape as the fourth insertion unit 304 according to the second embodiment of the present invention. That is, at least two fifth insertion units 305 among three or more fifth insertion units 305 inserted respectively into the fifth through holes 607A formed at three or more positions in the circumferential direction of the display element frame support member 607 may include a first cylinder unit 305A (an eccentric cylinder unit) and a second cylinder unit 305B (a concentric cylinder unit). As an example, the first cylinder unit 305A may be formed eccentrically with respect to the pivot axis (represented by the dot-dash line in FIG. 20) of the fifth insertion unit 305, and the second cylinder unit 305B and the third cylinder unit 305C may be formed concentrically with respect to the pivot axis of the fifth insertion unit 305.

The first cylinder unit 305A, the second cylinder unit 305B, and the third cylinder unit 305C included in the fifth insertion unit 305 may be sequentially arranged in the direction of the fifth insertion unit 305 being inserted into the fifth through hole 607A. In other words, when the fifth insertion unit 305 is inserted into the fifth through hole 607A, the outer wall of the first cylinder unit 305A may contact the inner wall of the seventh opening 607B of the fifth through hole 607A. Also, when the fifth insertion unit 305 is inserted into the fifth through hole 607A, the outer wall of the second cylinder unit 305B may contact the inner wall of the eighth opening 607C of the fifth through hole 607A. Also, when the fifth insertion unit 305 is inserted into the fifth through hole 607A, the outer wall of the third cylinder unit 305C may contact the inner wall of the fifth groove unit 606B of the display element frame 606.

When the fifth insertion unit 305 is inserted into the fifth through hole 607A, the outer wall of the first cylinder unit 305A arranged eccentrically with respect to the pivot axis of the fifth insertion unit 305 may contact the inner wall of the seventh opening 607B formed in parallel to the circumferential direction of the display element frame support member 607. Thus, when the coupling between the fifth through hole 607A and the fifth insertion unit 305 by the fifth screw 405 is loosened, the display element frame 606 may be inclined in the optical-axis direction of the electronic viewfinder 600 by pivoting the fifth insertion unit 305 by using a dedicated tool (not illustrated). The inclination of the display element frame 606 with respect to the optical-axis direction of the electronic viewfinder 600 may be adjusted by pivoting the fifth insertion units 305 inserted respectively into three fifth through holes 607A formed equidistantly in the circumferential direction of the display element frame support member 607. In other words, the inclination of the display element 602 may be adjusted by pivoting the fifth insertion unit 305 inserted into each of the three fifth through holes 607A provided in the circumferential direction of the display element frame support member 607.

The first cylinder unit 305A arranged eccentrically with respect to the pivot axis of the fifth insertion unit 305 may have a smaller height than the second cylinder unit 305B arranged concentrically with respect to the pivot axis of the fifth insertion unit 305. Accordingly, when the fifth insertion unit 305 inserted into the fifth through hole 607A is pivoted, a stress that may be generated between the seventh opening 607B of the fifth through hole 607A and the first cylinder unit 305A arranged eccentrically with respect to the pivot axis may be suppressed to a minimum.

In order to correspond to the height of the first cylinder unit 305A and the height of the second cylinder unit 305B, the depth of the seventh opening 607B of the fifth through hole 607A may be formed to be smaller than the depth of the eighth opening 607C. Accordingly, when the fifth insertion unit 305 inserted into the fifth through hole 607A is pivoted, a stress that may be generated between the seventh opening 607B and the first cylinder unit 305A may be suppressed to a minimum.

However, the present invention is not limited thereto, and the depth of the seventh opening 607B of the fifth through hole 607A may be equal to the depth of the eighth opening 607C.

Also, the first cylinder unit 305A may be arranged concentrically with respect to the pivot axis of the fifth insertion unit 305. In other words, the first cylinder unit 305A, the second cylinder unit 305B, and the third cylinder unit 305C may be arranged concentrically with respect to the pivot axis of the fifth insertion unit 305. However, in this case, the eccentricity and inclination of the display element 602 may not be adjusted even by pivoting the fifth insertion unit 305 while inserting the fifth insertion unit 305 into the fifth through hole 607A.

However, the eccentricity and the inclination of the display element 602 may be adjusted by modifying the shape of the seventh opening 607B and the eighth opening 607C of the fifth through hole 607A formed in the display element frame support member 607 after manufacturing the display element frame support member 607. For example, the shape of the seventh opening 607B and the eighth opening 607C of the fifth through hole 607A may be modified by modifying the mold of the display element frame support member 607.

As an example, only the inclination of the display element 602 may be adjusted by changing only the shape of the seventh opening 607B formed in parallel to the circumferential direction of the display element frame support member 607. Also, only the eccentricity of the display element 602 may be adjusted by changing only the shape of the eighth opening 607C formed in parallel to the optical-axis direction.

That is, only one of the inclination and eccentricity of the display element 602 may be adjusted without affecting the other. Accordingly, the inclination and eccentricity of the display element 602 may be adjusted more accurately by modifying the shape of the fifth through hole 607A formed in the display element frame support member 607 after manufacturing the display element frame support member 607.

The inclination of the display element 602 may be adjusted by pivoting the fifth insertion unit 305 by using a dedicated tool (not illustrated) in a state where the assembly of the display element frame support member 607 is nearly completed. Herein, the state where the assembly of the display element frame support member 607 is nearly completed may refer to a state where the substrate 601 and the display element 602 are attached to the display element frame 606 and the display element frame 606 and the lens units 603 to 605 are attached to the display element frame support member 607, in which the fifth insertion unit 305 is inserted into the fifth through hole 607A and the fifth screw 405 is loosely fastened to the fifth insertion unit 305 and the fifth groove unit 606B. Herein, the state where the fifth screw 405 is loosely fastened to the fifth insertion unit 305 and the fifth groove unit 606B may refer to a state where the fifth screw 405 is fastened to the fifth insertion unit 305 and the fifth groove unit 606B such that the fifth insertion unit 305 inserted into the fifth through hole 607A may be pivoted.

By the electronic viewfinder 600 according to the third embodiment of the present invention, by inserting the first cylinder unit 305A arranged eccentrically with respect to the pivot axis of the fifth insertion unit 305 into the seventh opening 607B formed in parallel to the circumferential direction of the display element frame support member 607 among a plurality of seventh openings 607B and eighth openings 607C constituting the fifth through hole 607A and pivoting the fifth insertion unit 305, the inclination of the display element 602 may be adjusted and the display element frame 606 supporting the display element 602 may be coupled to the display element frame support member 607.

Also, by disposing the second cylinder unit 305B eccentrically with respect to the pivot axis of the fifth insertion unit 305, inserting the second cylinder unit 305B into the eighth opening 607C formed in parallel to the optical axis, and pivoting the fifth insertion unit 305, the eccentricity of the display element 602 may be adjusted and the display element frame 606 supporting the display element 602 may be coupled to the display element frame support member 607.

In other words, with respect to the display element frame 606 supporting the display element 602, at each of three or more positions in the circumferential direction of the display element frame support member 607, without providing the opening for adjusting the eccentricity of the display element 602 and the opening for adjusting the inclination of the display element 602 adjacently in the optical-axis direction of the display element frame support member 607, just by providing one fifth through hole 607A at three or more positions in the circumferential direction of the display element frame support member 607, the inclination and eccentricity of the display element 602 may be adjusted and the display element frame 606 may be attached to the display element frame support member 607.

That is, in comparison with the case of disposing two openings adjacently in the optical-axis direction of the display element frame support member 607, it may be possible to adjust the inclination and eccentricity of the display element 602 while reducing the number of openings installed in the display element frame support member 607. Thus, it may be possible to prevent the increase of the size of the electronic viewfinder 600 and the constraint on the design of the electronic viewfinder 600 according to the disposition of two openings adjacently in the optical-axis direction of the display element frame support member 607. Thus, it may be possible to provide the display element support structure 607 that may adjust the inclination and eccentricity of the display element 602 without increasing the size of the electronic viewfinder 600 while maintaining the design freedom of the electronic viewfinder 600.

Also, the seventh opening 607B located at the outer peripheral side of the display element frame support member 607 may be formed to have a larger opening width than the eighth opening 607C located at the inner peripheral side of the display element frame support member 607. Accordingly, the fifth through hole 607A may be formed from the outside of the display element frame support member 607. Also, the display element frame support member 607 including the fifth through hole 607A may be molded by injection molding of outer slide core method.

While the present invention has been described above with reference to the embodiments thereof, the present invention is not limited to the above embodiments and various modifications may be made therein without departing from the scope of the present invention. For example, an element supported by the first lens frame 106, the second lens frame 107, and the third lens frame 108 is not limited to the lens unit and may be any other optical element such as a filter member or a diffractive optical element.

Also, the case where the frame support unit 105 is located at the position at which a variation of the optical performance of the imaging device 1 is greater than a certain variation by adjusting the inclination and eccentricity of the lens units L31 and L32 is not limited to the case where the zoom position is set to the wide end and the tele end.

The invention claimed is:

1. A lens barrel comprising:
a cylindrical lens frame supporting a lens unit and having three or more groove units arranged in a circumferential direction thereof;
a cylindrical frame support unit supporting the cylindrical lens frame and having three or more through holes formed in a circumferential direction of the cylindrical frame support unit to penetrate the cylindrical frame support unit; and
three or more insertion units inserted into the three or more groove units via the three or more through holes,
wherein a plurality of openings is formed at the three of more through holes,
wherein the plurality of openings has different opening widths and are arranged in a thicknesswise direction of the frame support unit,
wherein two or more insertion units among the three or more insertion units include,
a concentric cylinder unit arranged concentrically with respect to a pivot axis of an insertion portion, and
an eccentric cylinder unit arranged eccentrically with respect to the pivot axis of the insertion portion, and
wherein one or more of the plurality of openings have an elliptical shape with a major axis parallel to an optical axis of the lens barrel, and one or more of the other openings have an elliptical shape with a major axis parallel to the circumferential direction of the cylindrical frame support unit.

2. The lens barrel of claim 1,
wherein any one of the opening having an elliptical shape with a major axis parallel to the optical axis of the lens barrel and the opening having an elliptical shape with a major axis parallel to the circumferential direction of the cylindrical frame support unit is arranged at an outer wall side of the cylindrical frame support unit, and the other is arranged at an inner wall side of the cylindrical frame support unit.

3. The lens barrel of claim 1,
wherein, when adjusting the eccentricity of the lens unit, the eccentric cylinder unit is supported by the opening having an elliptical shape with a major axis parallel to the optical axis of the lens barrel among the plurality of openings included in the three or more through holes; and
wherein, when adjusting the inclination of the lens unit, the eccentric cylinder unit is supported by the opening having an elliptical shape with a major axis parallel to the circumferential direction of the cylindrical frame support unit among the plurality of openings included in the three or more through holes.

4. The lens barrel of claim 1, wherein the opening arranged at the outer wall side of the cylindrical frame support unit has a larger opening width than the opening arranged at the inner wall side of the cylindrical frame support unit.

5. The lens barrel of claim 1, further comprising:
a cylindrical guide tube arranged to surround the cylindrical frame support unit,
wherein an outer wall of the guide tube includes one or more opening units for attaching/detaching a dedicated tool for pivoting the insertion unit inserted into the three or more through holes from outside of the guide tube.

6. The lens barrel of claim 5,
wherein the cylindrical frame support unit is movable in an optical-axis direction of the lens barrel; and
wherein, when the lens unit is arranged at a wide end among a zoom position, the dedicated tool for adjusting the eccentricity or inclination of the lens unit is attached/detached through the opening unit.

7. The lens barrel of claim 5,
wherein the cylindrical frame support unit is movable in an optical-axis direction of the lens barrel; and
wherein, when the lens unit is arranged at a tele end among a zoom position, the dedicated tool for adjusting the eccentricity or inclination of the lens unit is attached/detached through the opening unit.

8. An imaging element support structure comprising:
an imaging element frame supporting an imaging element and having three or more groove units arranged in a circumferential direction thereof;
an imaging element frame support member supporting the imaging element frame and having three or more through holes formed in a circumferential direction of the imaging element frame support member to penetrate the imaging element frame support member; and
three or more insertion units inserted into the three or more groove units via the three or more through holes,
wherein a plurality of openings is formed at the three or more through holes,
wherein the plurality of openings has different opening widths and are arranged in a thincknesswise direction of the imaging element frame support member,
wherein two or more insertion units among the three or more insertion units include:
a concentric cylinder unit arranged concentrically with respect to a pivot axis of an insertion portion, and
an eccentric cylinder unit arranged eccentrically with respect to the pivot axis of the insertion portion, and
wherein one or more of the plurality of openings have an elliptical shape with a major axis parallel to an optical axis of the imaging element support structure, and one or more of the other openings have an elliptical shape with a major axis parallel to a circumferential direction of the imaging element frame support member.

9. The imaging element support structure of claim 8,
wherein the opening having an elliptical shape with a major axis parallel to the optical axis of the imaging element support structure is arranged at an outer wall of the imaging element support structure, and the opening having an elliptical shape with a major axis parallel to the circumferential direction of the imaging element frame support member is arranged at an inner wall of the imaging element support structure.

10. The imaging element support structure of claim 8,
wherein, when adjusting the eccentricity of the imaging element, the eccentric cylinder unit is supported by the opening having an elliptical shape with a major axis parallel to the optical axis of the imaging element support structure among the plurality of openings included in the three or more through holes; and
wherein, when adjusting the inclination of the imaging element, the eccentric cylinder unit is supported by the opening having an elliptical shape with a major axis parallel to the circumferential direction of the imaging element frame support member among the plurality of openings included in the three or more through holes.

11. The imaging element support structure of claim 8, wherein the opening arranged at an outer wall side of the imaging element frame support member has a larger opening width than the opening arranged at an inner wall side of the imaging element frame support member.

12. An electronic viewfinder comprising:
a display element frame supporting a display element and having three or more groove units arranged in a circumferential direction thereof;
a display element frame support member supporting the display element frame and having three or more through holes formed in a circumferential direction of the display element frame support member to penetrate the display element frame support member; and
three or more insertion units inserted into the three or more groove units via the three or more through holes,
wherein a plurality of openings is formed at the three or more through holes,
wherein the plurality of openings has different opening widths and are arranged in a thincknesswise direction of the display element frame support member,
wherein two or more insertion units among the three or more insertion units include;
a concentric cylinder unit arranged concentrically with respect to a pivot axis of the insertion portion, and
an eccentric cylinder unit arranged eccentrically with respect to the pivot axis of the insertion portion, and
wherein one or more of the plurality of openings have an elliptical shape with a major axis parallel to an optical axis of the electronic viewfinder, and one or more of the other openings have an elliptical shape with a major axis parallel to the circumferential direction of the display element frame support member.

13. The electronic viewfinder of claim 12,
wherein any one of the opening having an elliptical shape with a major axis parallel to the optical axis of the electronic viewfinder and the opening having an elliptical shape with a major axis parallel to the circumferential direction of the display element frame support member is arranged at an outer wall side of the display element frame support member, and the other is arranged at an inner wall side of the display element frame support member.

14. The electronic viewfinder of claim 12,
wherein, when adjusting the eccentricity of the display element, the eccentric cylinder unit is supported by the opening having an elliptical shape with a major axis parallel to the optical axis of the electronic viewfinder among the plurality of openings included in the three or more through holes; and
wherein, when adjusting the inclination of the display element, the eccentric cylinder unit is supported by the opening having an elliptical shape with a major axis parallel to the circumferential direction of the display element frame support member among the plurality of openings included in the three or more through holes.

15. The electronic viewfinder of claim 12, wherein the opening arranged at the outer wall side of the display element frame support member has a larger opening width than the opening arranged at the inner wall side of the display element frame support member.

* * * * *